United States Patent [19]

Obayashi

[11] Patent Number: 5,644,749

[45] Date of Patent: Jul. 1, 1997

[54] PARALLEL COMPUTER AND PROCESSOR ELEMENT UTILIZING LESS MEMORY

[75] Inventor: Yoshimasa Obayashi, Kyoto, Japan

[73] Assignee: Matsushita electric industrial co. ltd., Osaka-fu, Japan

[21] Appl. No.: 239,763

[22] Filed: May 9, 1994

[30] Foreign Application Priority Data

May 10, 1993 [JP] Japan ..................................... 5-108029

[51] Int. Cl.[6] ............................... G06F 9/26; G06F 9/34; G06F 12/00; G06F 12/02
[52] U.S. Cl. .................... 395/421.1; 395/421.11; 395/410; 395/418; 395/300; 395/800
[58] Field of Search ............................ 395/421.01, 300, 395/800, 421.1; 398/421.1, 421.11, 410, 418, 300, 800

[56] References Cited

U.S. PATENT DOCUMENTS

| | | | |
|---|---|---|---|
| 4,514,807 | 4/1985 | Nogi et al. | 395/800 |
| 4,873,626 | 10/1989 | Gifford | 395/300 |
| 5,129,093 | 7/1992 | Muramatsu et al. | 395/800 |
| 5,230,079 | 7/1993 | Grondalski | 395/800 |
| 5,408,677 | 4/1995 | Nogi et al. | 395/800 |

FOREIGN PATENT DOCUMENTS

| | | |
|---|---|---|
| 59-161763 | 9/1984 | Japan . |
| 546576 | 2/1993 | Japan . |
| 554007 | 3/1993 | Japan . |

OTHER PUBLICATIONS

"Parallel Programming Language ADETRAN" by Tatsuo Nogi, Memoirs of the Faculty of Engineering, Kyoto University, vol. L1, Part 4, Oct. 1989, pp. 235–290.

Primary Examiner—David K. Moore
Assistant Examiner—Than V. Nguyen
Attorney, Agent, or Firm—Price, Gess & Ubell

[57] ABSTRACT

The present invention discloses processor elements interconnected via a network in a parallel computer. The processor element includes a memory unit for storing a program and, per array-variable name, a partitioned array variable, the program being run simultaneously by the processor elements, each partitioned array variable being allocated to respective processor elements, a processor for carrying out a calculation using the partitioned array variable in the memory unit, the partitioned array variable being accessed by being addressed with a variable-name address that includes a code representing an array-variable name, an address converting unit for holding a variable-name address in relation with a physical address on the memory unit for each partitioned array variable to output a corresponding physical address in response to an input of the variable-name address from the processor, a transferring unit for transferring an array variable per array-variable name with the other processor elements via the network, the array variable being transferred to be stored into a free area acquired in the memory unit when a partition direction changes, the free area being as large as a storage area for one partitioned array variable, an address-correspondence updating unit for updating an address correspondence in the address converting unit with a pre-transfer variable-name address in relation with a post-transfer physical address each time the transferring unit completes the transfer per array-variable name.

11 Claims, 23 Drawing Sheets

FIG. 2  (PRIOR ART)

```
parameter (n=4)  ------ (1)
dimension a(n,n)  ------ (2)
dimension b(n,n)  ------ (3)
dimension a(/n/,n)  ------ (4)
dimension b(/n/,n)  ------ (5)
dimension a(n,/n/)  ------ (6)
dimension b(n,/n/)  ------ (7)
pass i=1,n,j=i,n    ------ (8)
    a(i,/j/)=a(i,j)  ------ (9)
pend              ------ (10)
        pdo j=1,n                          ------ (11)
            do i=2,n-1                     ------ (12)
                b(i,/j/)=a(i-1,/j/)-2 * a(i,/j/)+a(i+1,/j/) ------ (13)
            enddo                          ------ (14)
        pend                               ------ (15)
pass i=1,n,j=1,n    ------ (16)
    a(/i/,j)=a(i,/j/)  ------ (17)
    b(/i/,j)=b(i,/j/)  ------ (18)
pend              ------ (19)
        pdo i=2,n-1                        ------ (20)
            do j=2,n-1                     ------ (21)
                b(/i/,j)=b(/i/,j)+a(/i/,j-1)-2 * a(/i/,j)+a(/i/,j-1) ------ (22)
            enddo                          ------ (23)
        pend                               ------ (24)
```

FIG. 3    (PRIOR ART)

| PEa | PEb | PEc | PEd |
|---|---|---|---|
| 31a { a(1,/1/), a(2,/1/), a(3,/1/), a(4,/1/) | 31b { a(1,/2/), a(2,/2/), a(3,/2/), a(4,/2/) | 31c { a(1,/3/), a(2,/3/), a(3,/3/), a(4,/3/) | 31d { a(1,/4/), a(2,/4/), a(3,/4/), a(4,/4/) |
| 32a { b(1,/1/), b(2,/1/), b(3,/1/), b(4,/1/) | 32b { b(1,/2/), b(2,/2/), b(3,/2/), b(4,/2/) | 32c { b(1,/3/), b(2,/3/), b(3,/3/), b(4,/3/) | 32d { b(1,/4/), b(2,/4/), b(3,/4/), b(4,/4/) |
| 33a { a(/1/,1), a(/1/,2), a(/1/,3), a(/1/,4) | 33b { a(/2/,1), a(/2/,2), a(/2/,3), a(/2/,4) | 33c { a(/3/,1), a(/3/,2), a(/3/,3), a(/3/,4) | 33d { a(/4/,1), a(/4/,2), a(/4/,3), a(/4/,4) |
| 34a { b(/1/,1), b(/1/,2), b(/1/,3), b(/1/,4) | 34b { b(/2/,1), b(/2/,2), b(/2/,3), b(/2/,4) | 34c { b(/3/,1), b(/3/,2), b(/3/,3), b(/3/,4) | 34d { b(/4/,1), b(/4/,2), b(/4/,3), b(/4/,4) |

FIG. 12A

| VARIABLE NAME | ELEMENT'S No. |
|---|---|
| HIGH ORDER ADDRESS | LOW ORDER ADDRESS |

FIG. 12B

| b15 | | | | | | | b8 | b7 | | | | | | | b0 |
|---|---|---|---|---|---|---|---|---|---|---|---|---|---|---|---|
| 0 | 0 | 0 | 0 | 0 | 0 | 0 | 0 | 0 | 0 | 0 | 0 | 1 | 0 | X | X |

VARIABLE NAME a(//,)(=00H)   ELEMENT'S No.2

FIG. 12C

| b15 | | | | | | | b8 | b7 | | | | | | | b0 |
|---|---|---|---|---|---|---|---|---|---|---|---|---|---|---|---|
| 0 | 0 | 0 | 1 | 0 | 0 | 0 | 0 | 0 | 0 | 0 | 0 | 1 | 0 | X | X |

VARIABLE NAME a(,//)(=10H)   ELEMENT'S No.2

FIG. 12D

| b15 | | | | | | | b8 | b7 | | | | | | | b0 |
|---|---|---|---|---|---|---|---|---|---|---|---|---|---|---|---|
| 0 | 0 | 0 | 0 | 0 | 0 | 0 | 1 | 0 | 0 | 0 | 0 | 1 | 1 | X | X |

VARIABLE NAME b(//,)(=01H)   ELEMENT'S No.3

FIG. 12E

| b15 | | | | | | | b8 | b7 | | | | | | | b0 |
|---|---|---|---|---|---|---|---|---|---|---|---|---|---|---|---|
| 0 | 0 | 0 | 1 | 0 | 0 | 0 | 1 | 0 | 0 | 0 | 0 | 1 | 1 | X | X |

VARIABLE NAME b(,//)(=11H)   ELEMENT'S No.3

FIG. 14B

| ADDRESS TABLE 70 ||
|---|---|
| VARIABLE NAME | PHYSICAL ADDRESS |
| a(,//) | 00H |
| b(,//) | 10H |

FIG. 14C

| ADDRESS UPDATING TABLE 114 ||
|---|---|
| VARIABLE NAME | POST-DATA-TRANSFER PHYSICAL ADDRESS |
| null | null |

FIG. 15B

| ADDRESS TABLE 70 ||
|---|---|
| VARIABLE NAME | PHYSICAL ADDRESS |
| a(,//) | 00H |
| b(,//) | 10H |
| | |

FIG. 15C

| ADDRESS UPDATING TABLE 114 ||
|---|---|
| VARIABLE NAME | POST-DATA-TRANSFER PHYSICAL ADDRESS |
| a(//,) | 20H |
| | |

FIG. 16B

| ADDRESS TABLE 70 | |
|---|---|
| VARIABLE NAME | PHYSICAL ADDRESS |
| a(//,) | 20H |
| b(,//) | 10H |

FIG. 16C

| ADDRESS UPDATING TABLE 114 | |
|---|---|
| VARIABLE NAME | POST-DATA-TRANSFER PHYSICAL ADDRESS |
| null | null |

FIG. 17B

| ADDRESS TABLE 70 ||
| --- | --- |
| VARIABLE NAME | PHYSICAL ADDRESS |
| a(//,) | 20H |
| b(,//) | 10H |

FIG. 17C

| ADDRESS UPDATING TABLE 114 ||
| --- | --- |
| VARIABLE NAME | POST-DATA-TRANSFER PHYSICAL ADDRESS |
| b(//,) | 00H |

FIG. 18B

| ADDRESS TABLE 70 | |
|---|---|
| VARIABLE NAME | PHYSICAL ADDRESS |
| a(//,) | 20H |
| b(//,) | 10H |

FIG. 18C

| ADDRESS UPDATING TABLE 114 | |
|---|---|
| VARIABLE NAME | POST-DATA-TRANSFER PHYSICAL ADDRESS |
| null | null |

PARALLEL COMPUTER AND PROCESSOR ELEMENT UTILIZING LESS MEMORY

BACKGROUND OF THE INVENTION (1) Field of the Invention

The present invention relates to a parallel computer that processes data in parallel by transferring partitioned data between a plurality of processor elements.

(2) Description of the Related Art

In recent years, parallel computers, which utilize a plurality of processor elements (PE's) simultaneously, are used for numerical calculation that involves a massive amount of data to speed up an overall operation.

Of various models being developed, distributed-memory type parallel computers have been put into practical use. This model is suitable particularly for an array calculation. This is because the massive amount of data used in the numerical calculation are generally described by arrays, and this model stores both programs and distributed data (partitioned array) in the PE's to do a calculation in parallel.

In the array calculation, array elements are used repetitively: an array is partitioned into a plurality of sets of elements in the direction of a subscript depending on programs, and the resulting array data (sets of array elements) are distributed to the PE's to be stored into their respective memories each time the direction changes. Typical arrays are of two- or three-dimension, and the allocation of the array data to the PE's depends on the direction of partition. Hence, it frequently happens that a program and the array data necessary for that program are not stored in the same PE.

In such a case, or when each PE demands array data partitioned in different directions, the array elements are transferred between the PE's. More precisely, each PE sends unnecessary array data to the other PE's while receiving necessary array data from the other PE's via a network interconnecting the PE's. This data transfer enables the PE's to calculate the array partitioned in different directions simultaneously.

Parallel with the advancement of the computers, programming languages have been developed as well. For example, HPF (High Performance Fortran Language) and ADETRAN (ADENART FORTRAN) have been proposed for the above distributed-memory type parallel computers. [For further information, see "High Performance Fortran Language Specification Version 1.0", High Performance Fortran Forum, May 1993 and "Parallel Programming Language ADETRAN", Tatsuo Nogi, Memoirs of Faculty of Engineering, Kyoto University Vol. 51, No. 4, 1989]

FIG. 1 is a block diagram depicting a structure of a conventional distributed-memory type parallel computer. This computer includes a plurality of PE's interconnected via a network 3. Although the number of the PE's varies from several to hundreds or more, assume that the computer includes four PE's (PEa–PEd) herein, and only PEa, PEb are shown in FIG. 1 for simplification. Note that all the PE's are of the same structure.

The PE comprises a local memory 1, a data transfer unit 2, a processor 4, an address bus 5, and a data bus 6.

More precisely, the local memory 1 stores a program for the processor 4 and the array data. The data transfer unit 2 sends array data from the local memory 1 to the other PE's via the network 3 while storing the array data sent from the other PE's into the local memory 1. The processor 4 runs the program, or calculates, using the array data stored in the local memory 1. The address bus 5 sends out an address signal while the data bus 6 sends out a data signal each time the array data are read out from or written into the local memory 1.

FIG. 2 is a source program composed of twenty-four statements in ADETRAN: seven declaration statements, seven pass statements, and ten executable statements. The declaration statements are: Parameter Statement (1) specifying an array size, or the number of array elements in one direction; Declaration Statements (2), (3) showing that two-dimensional arrays a, b are subject to calculation; and Declaration Statements (4)–(7) instructing to acquire storage areas in each local memory 1 for the array partitioned in the direction of a subscript between slashes.

FIG. 3 is a memory map of the storage areas for the arrays a, b acquired according to Statements (4)–(7) in each local memory 1. To be more specific, Storage Areas 33a–33d are acquired by Declaration Statement (6) to store the array a partitioned in the direction of a second subscript (j-direction): Storage Areas 33a, 33b, 33c, and 33d are acquired for the sets of the array elements, a(/1/,1)–a(/1/,4), a(/2/,1)–a(/2/,4), a(/3/,1)–a(/3/,4), and a(/4/,1)–a(/4/,4), respectively. Similarly, Storage Areas 34a–34d are acquired by Declaration Statement (7) to store the array b partitioned in the same direction. Also, Storage Areas 31a–31d and 32a–32d are acquired by Declaration Statements (4), (5) to store the arrays a, b partitioned in the direction of a first subscript (i-direction), respectively.

Pass Statements (8)–(10) instruct to partition the array a(n, n) in the j-direction to distribute the resulting array data (sets of array elements) to respective PE's.

Executable Statements (11)–(15) instruct each processor 4 to process the array data distributed in accordance with Pass Statements (8)–(10) simultaneously.

Pass Statements (16)–(19) instruct to re-partition the array a(n, n) in the i-direction to distribute the resulting array data to respective PE's.

Executable Statements (20)–(24) instruct each processor 4 to process the array data distributed in accordance with Pass Statements (16)–(19) simultaneously.

For further understanding, the operation of the conventional distributed-memory parallel computer when run by the above source program will be given.

First, the source program is translated into a machine language by a compiler for parallel computers, and Statements (4)–(24) are loaded into each local memory 1 via the network 3 by an unillustrated control unit.

Accordingly, each PE acquires the storage areas as shown in FIG. 3 in accordance with translated Declaration Statements (4)–(7). Note that although the storage areas are acquired, the array data are not stored yet at this point. The array data, or the partitioned array in the j-direction, are allocated to their own local memories 1 and stored into their respective storage areas in accordance with translated Pass Statements (8)–(10). In case of PEa, for example, the data transfer unit 2 receives the set of the array elements a(1,/1/)–a(4,/1/) via the network 3, and writes the same into the local memory 1 via the data bus 6. PEb–PEd operate in the same way, and as a result, the array a are partitioned in the j-direction and subsequently distributed to Storage Areas 31a–31d as shown in FIG. 3.

Next, each PE computes in parallel to find b(i,/j/) using the distributed array elements in accordance with translated Executable Statements (11)–(15), and b(i,/j/) thus found is written into their local memories 1. In case of PEa, for example, the processor 4 processes the array elements in accordance with translated Executable Statement (13). PEb–PEd operate in the same way, and as a result, the array b are partitioned in the j-direction and subsequently distributed to Storage Areas 32a–32d as shown in FIG. 3.

Accordingly, each PE transfers the array elements via the network 3 to re-partition the arrays a, b in the i-direction to distribute the resulting data elements to respective PE's in accordance with translated Pass Statements (16)–(19). In case of PEa, for example, the data transfer unit 2 sends the array elements currently stored in Storage Area 31a, 32a to the other PE's via the network 3, which is illustrated by FIG. 4: the array elements a(2,/1/), a(3,/1/), and a(4,/1/) in Storage Area 31a are sent to Storage Area 33b in PEb, 33c in PEc, and 33d in PEd, respectively, and the array elements b(2,/1/), b(3,/1/), and b(4,/1/) in Storage Area 32a are sent to the other PE's in the same way. On the other hand, the data transfer unit 2 writes the array elements sent from the other PE's into Storage Areas 33a, 34a, which is illustrated by FIG. 5: the array elements a(1,/2/) in PEb, a(1,/3/) in PEc, and a(1,/4/) in PEd are sent to Storage Area 33a, while the array elements b(1,/2/) in PEb, b(1,/3/) in PEc, and b(1,/4/) in PEd being sent to Storage Area 34a.

Subsequent to this array-element transfer, each PE processes the array elements thus stored in parallel to find b(/i/,j) in accordance with Executable Statements (20)–(24), and b(/i/,j) thus found is written into their respective local memories 1. In case of PEa, for example, the processor 4 processes the array elements in accordance with Executable Statement (22); PEb–PEd operate in the same way.

As has been explained, the inbound and outbound array elements are transferred simultaneously, and each PE must have a storage capacity at least twice as large as one array for each array. Because if it has a storage capacity only as large as one array, the array elements in the storage area may be overwritten by those received from the other PE's before they are sent to the other PE's. This undesirably increases the memory capacity, particularly when the arrays are of higher-dimension where there are as many partition directions as the number of subscripts.

SUMMARY OF THE INVENTION

Accordingly, the present invention has an object to provide a parallel computer that utilizes less memory in each PE even when an array is re-partitioned for several times.

The present invention has another object to provide a parallel computer that facilitates addressing an array variable.

The above objects are fulfilled by processor elements interconnected via a network in a parallel computer, the processor element including: a memory unit for storing a program and, per array-variable name, a partitioned array variable, the program being run simultaneously by the processor elements, each partitioned array variable being allocated to respective processor elements; a processor for carrying out a calculation using the partitioned array variable in the memory unit, the partitioned array variable being accessed by being addressed with a variable-name address that includes a code representing an array-variable name; an address converting unit for holding a variable-name address in relation with a physical address on the memory unit for each partitioned array variable to output a corresponding physical address in response to an input of the variable-name address from the processor; a transferring unit for transferring a partitioned array variable per array-variable name with other processor elements via the network, the partitioned array variable being transferred to be stored into a free area acquired in the memory unit when a partition direction changes, the free area being as large as a storage area for one partitioned array variable; and an address-correspondence updating unit for updating an address correspondence in the address converting unit with a pretransfer variable-name address in relation with a post-transfer physical address each time the transferring unit completes the transfer per array-variable name.

The variable-name address may include a first address unit and a second address unit, the first address unit representing a variable name of a partitioned array variable while the second address unit representing an element number contained in the array variable.

The first address unit may be a high order address of the variable-name address and the second address unit may be a low address thereof.

The first address unit may include the code representing the array-variable name, the code being a character code.

The first address unit may include the code representing the array-variable name, the code also representing a partition direction.

According to the above construction, the memory unit utilizes the free area as large as one partitioned array variable for the transferred partitioned array variable even when one or more than one array is re-partitioned. As a result, the processor element utilizes less memory compared with the conventional one. Also, the processor can access to one partitioned array variable by addressing the same variable-name address when the physical address in the memory unit changes due to the change of the partition direction.

Further, in the processor element, the address converting unit may include: an address latch circuit for latching an address including the variable name, the address being outputted from the processor and from the transferring unit; an associative memory for holding the first address unit in relation with a high order of the physical address on the memory unit for each partitioned array variable in the memory unit to convert the first address unit of the latched address into a high order of a corresponding physical address; and an output circuit for outputting the physical address to the memory unit by combining the high order of the physical address from the associative memory and the second address unit from the address latch circuit.

The associative memory may hold the first address unit in relation with a high order of a physical address of the free area, the first address unit representing the free area instead of the variable name of the partitioned array variable.

The transferring unit may include: a first address-generating unit for generating an address to read out a partitioned array variable to be sent to the other processor elements from the memory unit, the partitioned array variable being sent via the network; a second address-generating unit for generating an address to write a partitioned array variable received from the other processor elements into the free area, the partitioned array variable being received via the network; an I/O unit for outputting the readout partitioned array variable from the memory unit to the network, and inputting the partitioned array variable received from the network into the free area; and a controlling unit for controlling the readout of the partitioned array variable from the memory unit in accordance with the readout address generated by the first address-generating unit to be outputted to the other processor elements via the I/O unit, and the writing of the partitioned array variable received from the other processor elements via the I/O unit into the free area in accordance with the write-in address generated by the second address-generating unit.

The first address-generating unit may generate the variable-name address as the readout address, and the second address-generating unit may generate the variable-name address as the write-in address.

According to the above construction, even when the physical address of the free area in the memory unit changes, the transferring unit can access to the pre-transfer partitioned array variable and post-transfer free area by addressing the same variable-name address that representing the free area.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 2 is a view showing an example of a source program for a parallel computer;

FIG. 3 is a memory map showing acquired storage areas in a local memory of each PE;

FIGS. 12A through 12E are illustrations showing a bit structure of a variable-name address;

FIG. 14B is an address table corresponding to FIG. 14A;

FIG. 14C is an address updating table corresponding to FIG. 14A;

FIG. 15B is an address table corresponding to FIG. 15A;

FIG. 15C is an address updating table corresponding to FIG. 15A;

FIG. 16B is an address table corresponding to FIG. 16A;

FIG. 16C is an address updating table corresponding to FIG. 16A;

FIG. 17B is an address table corresponding to FIG. 17A;

FIG. 17C is an address updating table corresponding to FIG. 17A;

FIG. 18B is an address table corresponding to FIG. 18A; and

FIG. 18C is an address updating table corresponding to FIG. 18A.

DESCRIPTION OF THE PREFERRED EMBODIMENT

Figure 1:
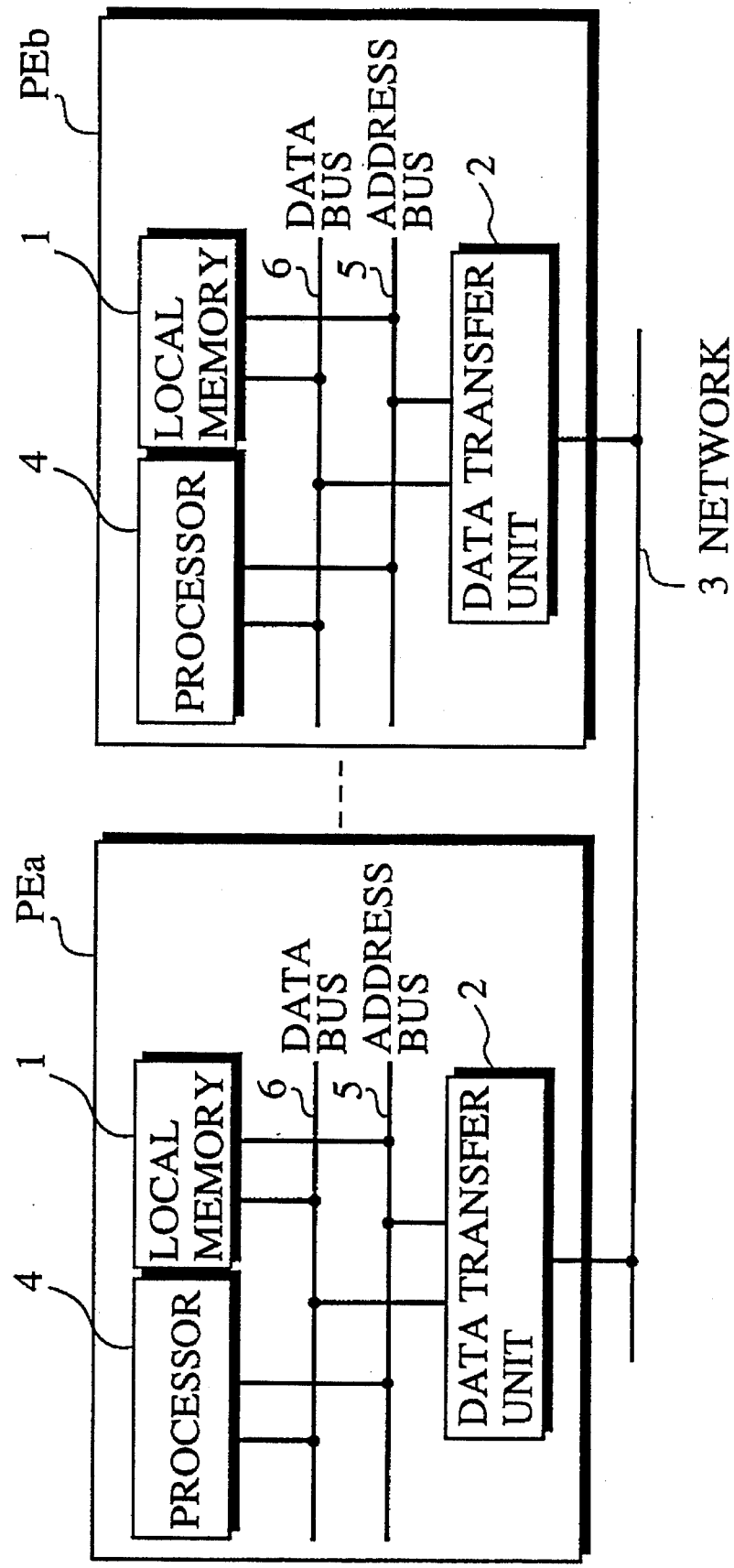
FIG. 1 is a block diagram depicting a structure of a conventional parallel computer.
Figure 4:
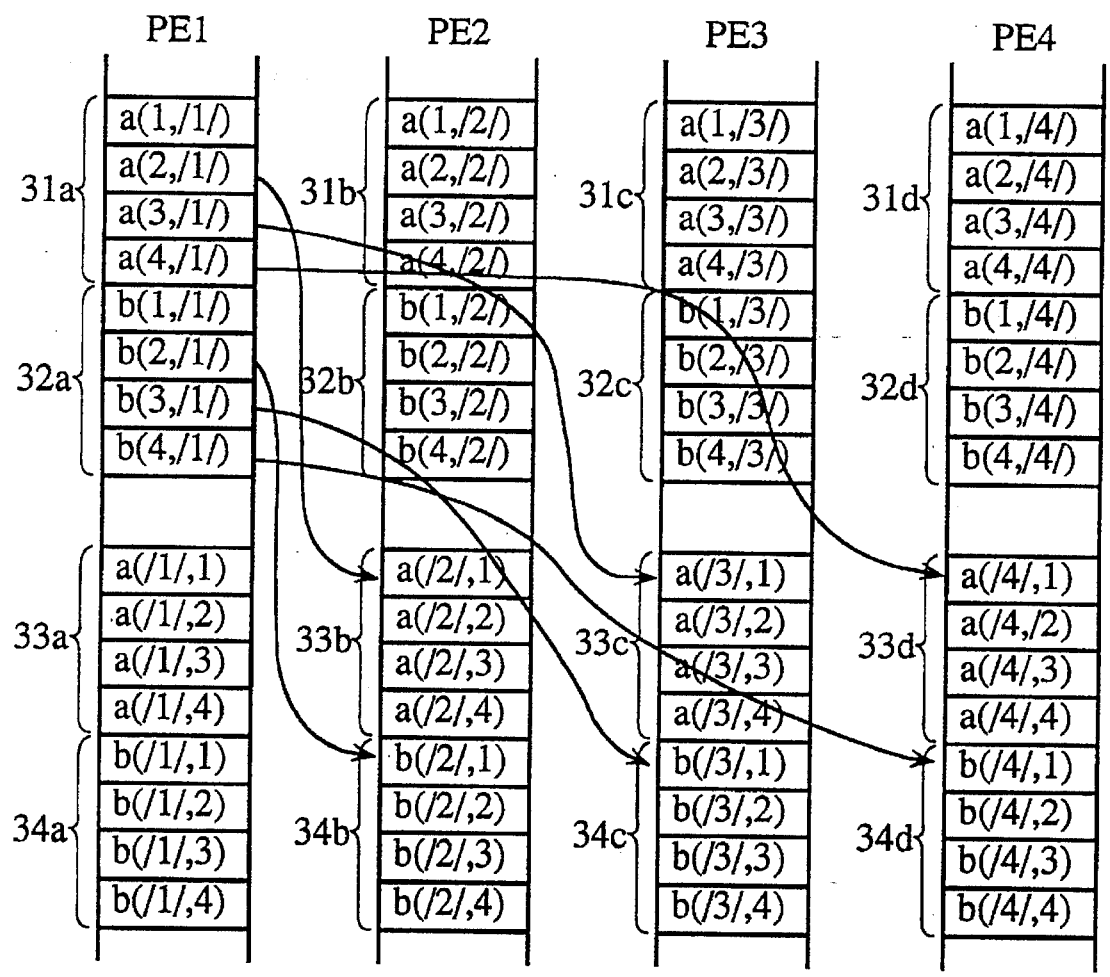
FIG. 4 is a view explaining how PEa sends array elements to other PE's when the arrays are re-partitioned.
Figure 5:
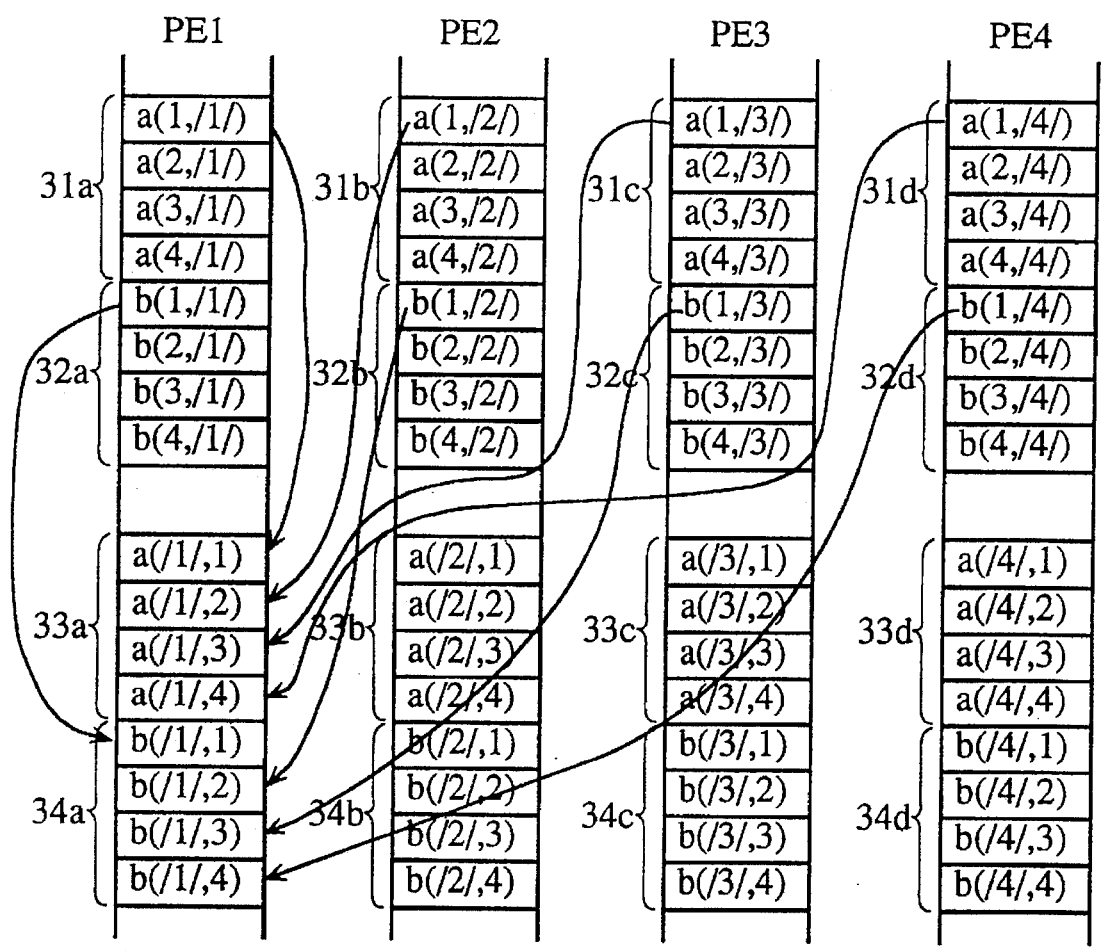
FIG. 5 is a view explaining how PEa receives array elements from other PE's when the arrays are re-partitioned.
Figure 6:
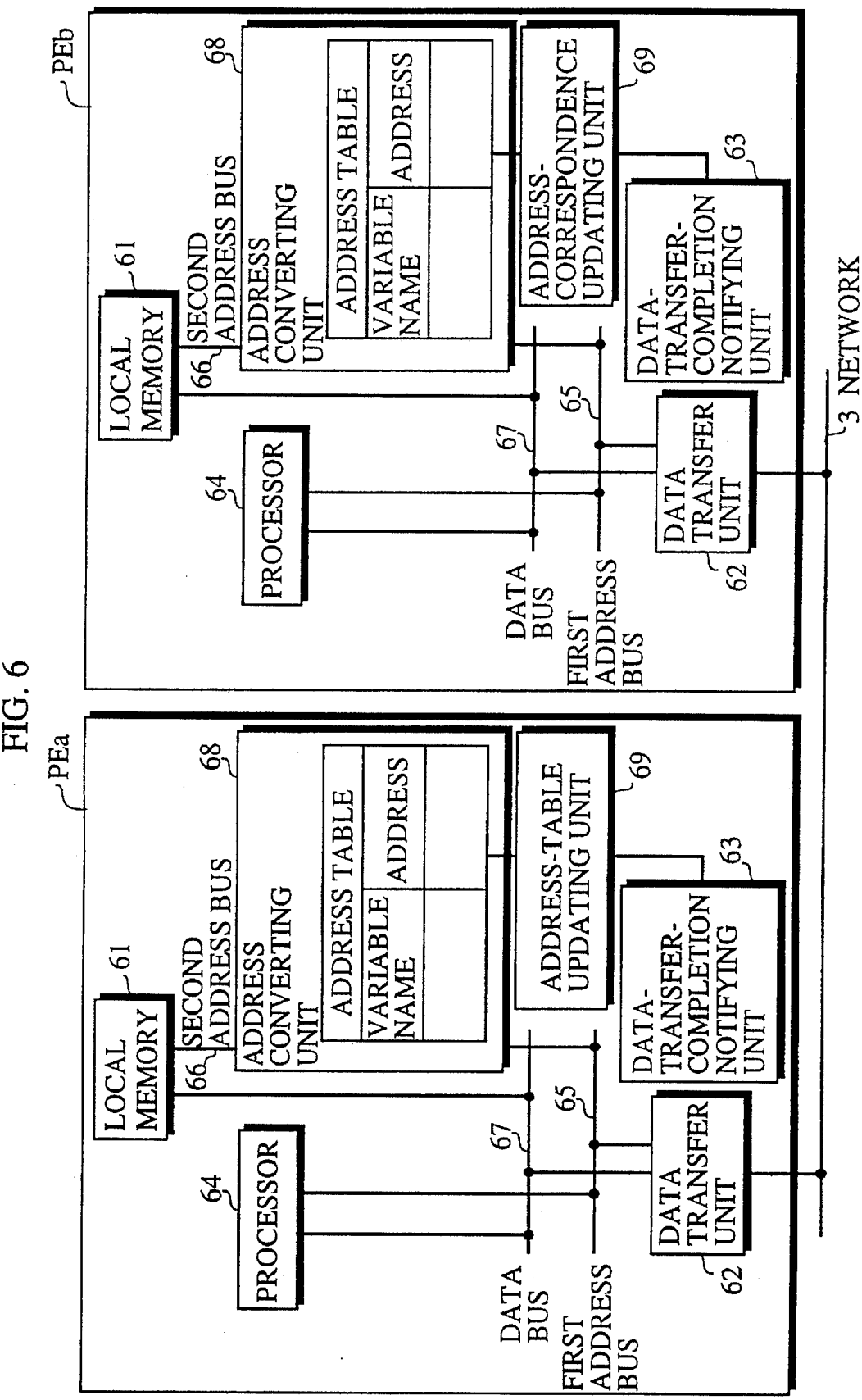
FIG. 6 is a block diagram depicting a structure of a parallel computer of the present invention.

FIG. 6 is a block diagram depicting a structure of a parallel computer of the present invention. The parallel computer comprises a plurality of PE's interconnected via a network 3, and all the PE's are of the same structure. Although as many PE's as desired (e.g., 4, 16, 128, ...) can be interconnected in practice, assume that four PE's, PEa–PEd, are interconnected in this embodiment, and only PEa, PEb are shown in the drawing for simplification.

The PE comprises a local memory 61, a data transfer unit 62, a data-transfer-completion notifying unit 63, a processor 64, a first address bus 65, a second address bus 66, a data bus 67, an address converting unit 68, and an address-table updating unit 69.

The local memory 61 stores a program which is run by the processor 64 and array data for that program. The array data referred herein are sets of array elements allocated to their respective PE's, and the sets of array elements are obtained by partitioning an array based on that program.

The data transfer unit 62 sends the array data stored in the local memory 61 to the other PE's while receiving the array data from the other PE's to store the same in its local memory 61; the array data are transferred via the network 3.

The data-transfer-completion notifying unit 63 (hereinafter simply referred to as the notifying unit 63) detects the completion of the foregoing array-data transfer in both ways and notifies the same to the address-table updating unit 69.

The processor 64 runs a program stored in the local memory 61, or calculates using the array data also stored in the local memory 61.

It should be noted that, unlike the conventional processor, the processor 64 can access to the array elements not by their individual addresses but by an address consisting of an array name, partition direction, and array-element's number, which will be referred to as "variable-name address" hereinafter. More precisely, when an array a is partitioned in the direction of first and second subscripts, the resulting array elements a(/1/,1) and a(1,/1/) are stored in different storage areas at different addresses. Thus, the processor 64 accesses to each of the array elements by addressing the variable-name address depending on the partition direction. Likewise, the processor 64 accesses to either a(2,/1/) or a(/1/,2), and a(3,/1/) or a(/1/,3) by addressing their respective variable-name addresses.

An example of a bit-structure of the variable-name address is shown in FIGS. 12A through 12E. As shown in FIG. 12A, a high order address represents the variable (array) name, while a low order address representing the element's number that identifies its location within the array. FIG. 12B shows an example of 16-bit address of the array a which is partitioned in the direction of the first subscript: the high order address (bit 15-8=00H) represents the variable name a and the direction of partitioning of the first subscript; a part of the low order address (bit 7-2=02H) identifies itself as being the second element in the array a, while the remaining part of the low order address (bit 1, 0) represents a byte address of the 4-byte-long array element. The processor 64 can access to the array element a(/1/,2) by addressing the variable-name address constructed as above. FIG. 12C is an example for the array a which is partitioned in the direction of the second subscript, FIG. 12D is an example for the array b which is partitioned in the direction of the first subscript, and FIG. 12E is an example for the array b which is partitioned in the direction of the second subscript; the detailed explanation is omitted as the structure is the same.

The first address bus 65 sends both the variable-name and physical address addressed by the processor 64 and data transfer unit 62 to the address converting unit 68.

The second address bus 66 sends an address outputted from the address converting unit 68, which will be referred to as "physical address" hereinafter, to the local memory 61.

The data bus 67 transfers the array data between the local memory 61 and processor 64.

The address converting unit 68 converts the variable-name address received from the processor 64 and data transfer unit 62 via the data bus 67 into the physical address using an address table 70; the address table 70 stores the variable-name addresses in relation with the physical addresses for each array name.

The address-table updating unit 69 updates the address table 70 when the partition direction is changed by the data transfer unit 62, i.e., when the physical addresses in the local memory 61 are updated.

Figure 7:
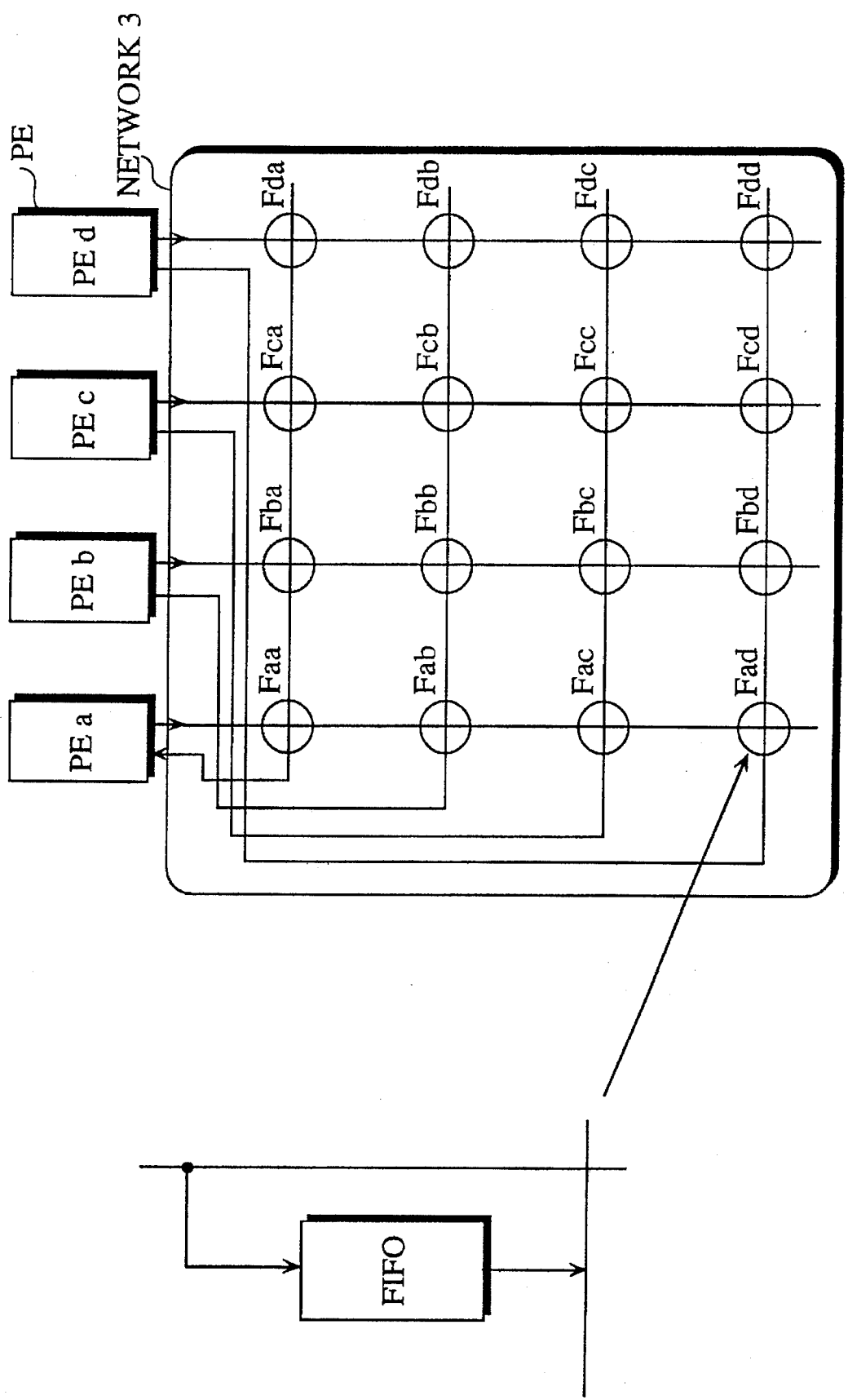
FIG. 7 is a block diagram depicting a structure of a network in FIG. 6.

The network 3 that interconnects the PE's is depicted by a block diagram in FIG. 7, and each PE is connected to the network 3 via a data-sending line and a data-receiving line. In the drawing, Faa through Fdd are FIFOs and they are installed at the intersections of the data-sending and data-receiving lines, respectively. The FIFOs withhold the array data sent via the data-receiving lines temporarily and send the same via the data-sending lines, and thus serving as a buffer during the array-data transfer. For example, when the array data are sent to PEb from PEa, the array data are sent in two steps; first, they are sent from PEa to Fab, and then from Fab to PEb. Similarly, when the array data are sent to PEb from PEa, first they are sent from PEb to Fba, and then from Fba to PEa in two steps.

For further understanding, some of the aforementioned components are described more in detail.

Figure 8:
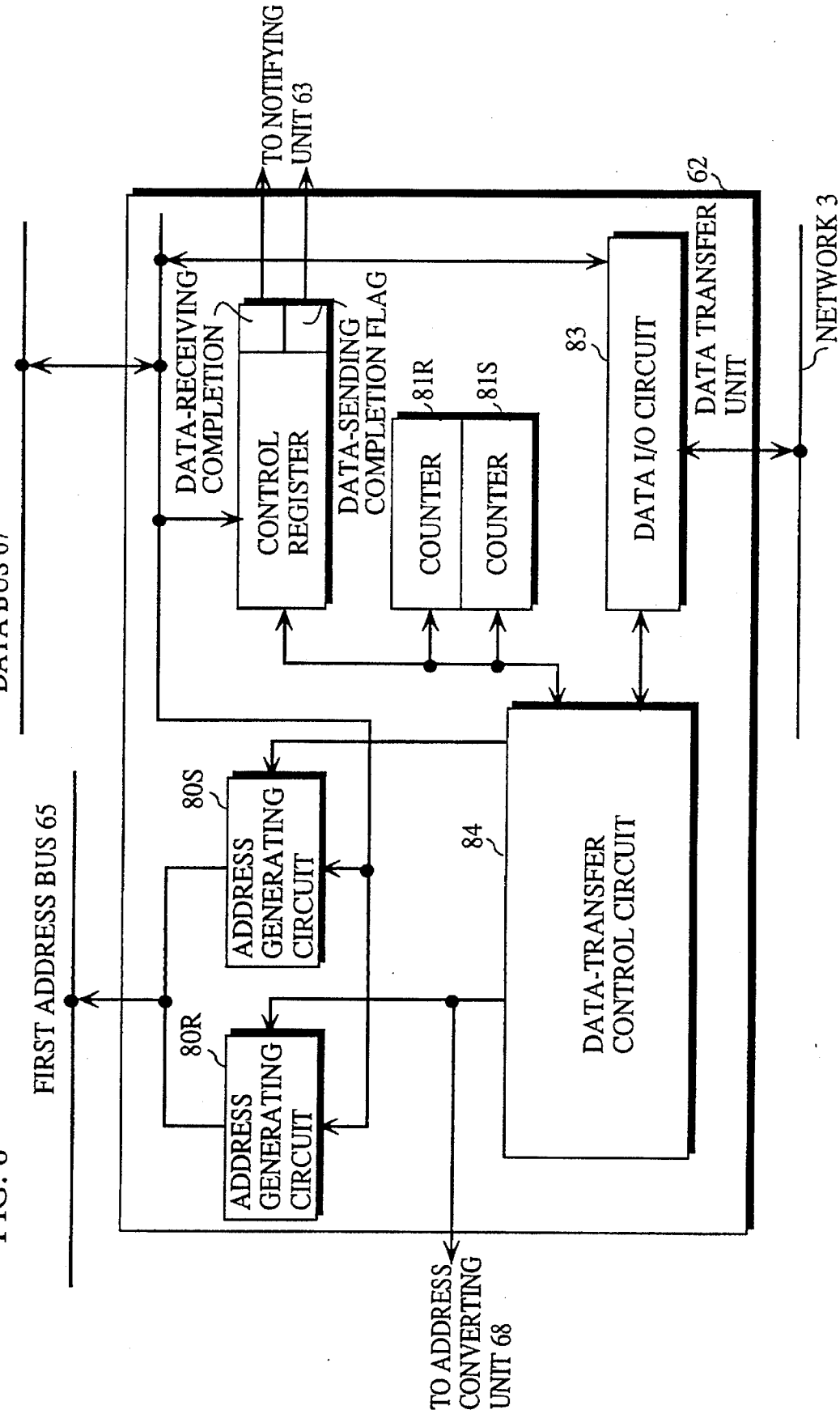
FIG. 8 is a block diagram depicting a structure of a data transfer unit in FIG. 6.

A structure of the data transfer unit 62 is depicted in FIG. 8. The data transfer unit 62 comprises two address generating circuits 80R, 80S, two counters 81R, 81S, a control register 82, a data I/O circuit 83, and a data-transfer control circuit 84; these components are interconnected via the data bus 67 and first address bus 65.

The address generating circuits 80R, 80S independently generate addresses in the local memory 61 when transferring the array data. Two address generating circuits are installed because the array data are transferred in both ways: the address generating circuit 80R generates a write-in address (physical address) in the local memory 61 when the PE receives the array data from the FIFO, and the address generating circuit 80S generates a readout address (variable-name address) in the local memory 61 when the array data are sent from the PE to the FIFO.

The counter 81R counts the number of array-data transfer by counting a number each time the address generating circuit 80R generates the physical address. The initial counting value is set by the processor 64 and the array data are successively transferred until the counting value reaches a predetermined value. For example, when the counter 81R is to count down from an initial counting value "10", then the array data are transferred until the counter counts down to zero.

The counter 81S operates in the same way as above except that it counts a number each time the address generating circuit 80S generates the variable-name address.

The control register 82 holds parameters used to control the array-data transfer. The parameters referred herein are, for example, fields for a data size, status, and an array-data transfer mode; the data size field specifies the size of the array data and the status field exhibits whether the array data are being transferred or have been transferred, while the transfer mode field exhibits the direction of the array-data transfer, or determines which of the two address generating circuits generates the readout or write-in address. Further, the control register 82 includes two flags that exhibit the completion of the array-data transfer: one for array-data receiving and the other for array-data sending. The former shows that a certain volume of array data has been received from other PE's with the use of the address generating circuit 80R and counter 81R, and the latter shows that a certain volume of array data has been sent to other PE's with the use of the address generating circuit 80S and counter 81S. The certain volume of array data referred herein means all the array elements that should be transferred due to repartitioning.

The data I/O circuit 83 is connected to the data-receiving and data-sending lines of the network 3 to transfer the array data between the data-receiving or data-sending line and data bus 67.

The data transfer control circuit 84 controls the foregoing array-data transfer in two ways: one uses the address generating circuit 80R and counter 81R, and the other uses the address generating circuit 80S and counter 81S. This control is done simultaneously in accordance with the contents in the control register 82, counters 81R, 81S. To be more specific, the address generating circuit 80R generates the physical address in the local memory 61, while at the same time the address generating circuit 80S generates the variable-name address in the local memory 61, and further the array data are transferred between the local memory 61 and data I/O circuit 83 under the control of the data-transfer control circuit 84.

Figure 13:
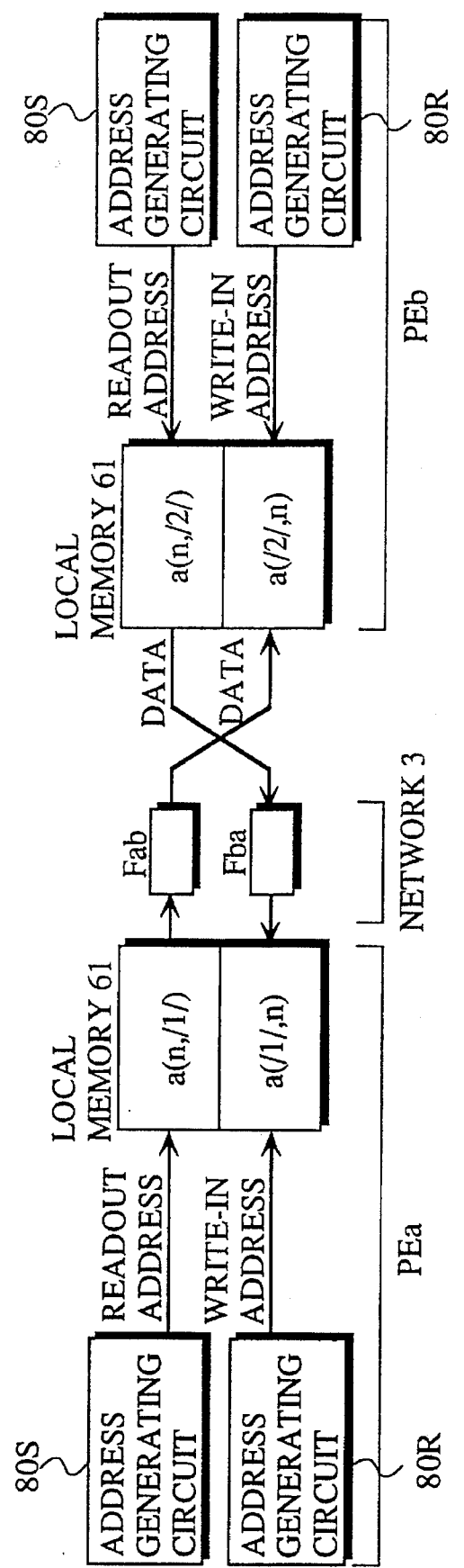
FIG. 13 is a view explaining the array-data transfer between the PE's.

FIG. 13 explains how the array data are transferred between the PE's when the arrays are re-partitioned. The array data are transferred between all the four PE's in effect, but the array-data transfer between only the PEa and PEb are shown in the drawing for simplification. Assume that the array a which has been partitioned in the direction of the second subscript is re-partitioned in the direction of the first subscript. Then, in the PEa, the array element a(n,/1/) in the local memory 61 is addressed by the readout address (variable-name address) generated by the address generating circuit 80S and sent to PEb. On the other hand, the array element a(/1/,n) is stored into the write-in address (physical address) in the local memory 61, which is generated and addressed by the address generating circuit 80R. The address generating circuit 80R addresses the physical address, because the variable-name address of the storage area acquired for the array to be written into is not in the address table 70 yet, making the address converting impossible.

Figure 9:
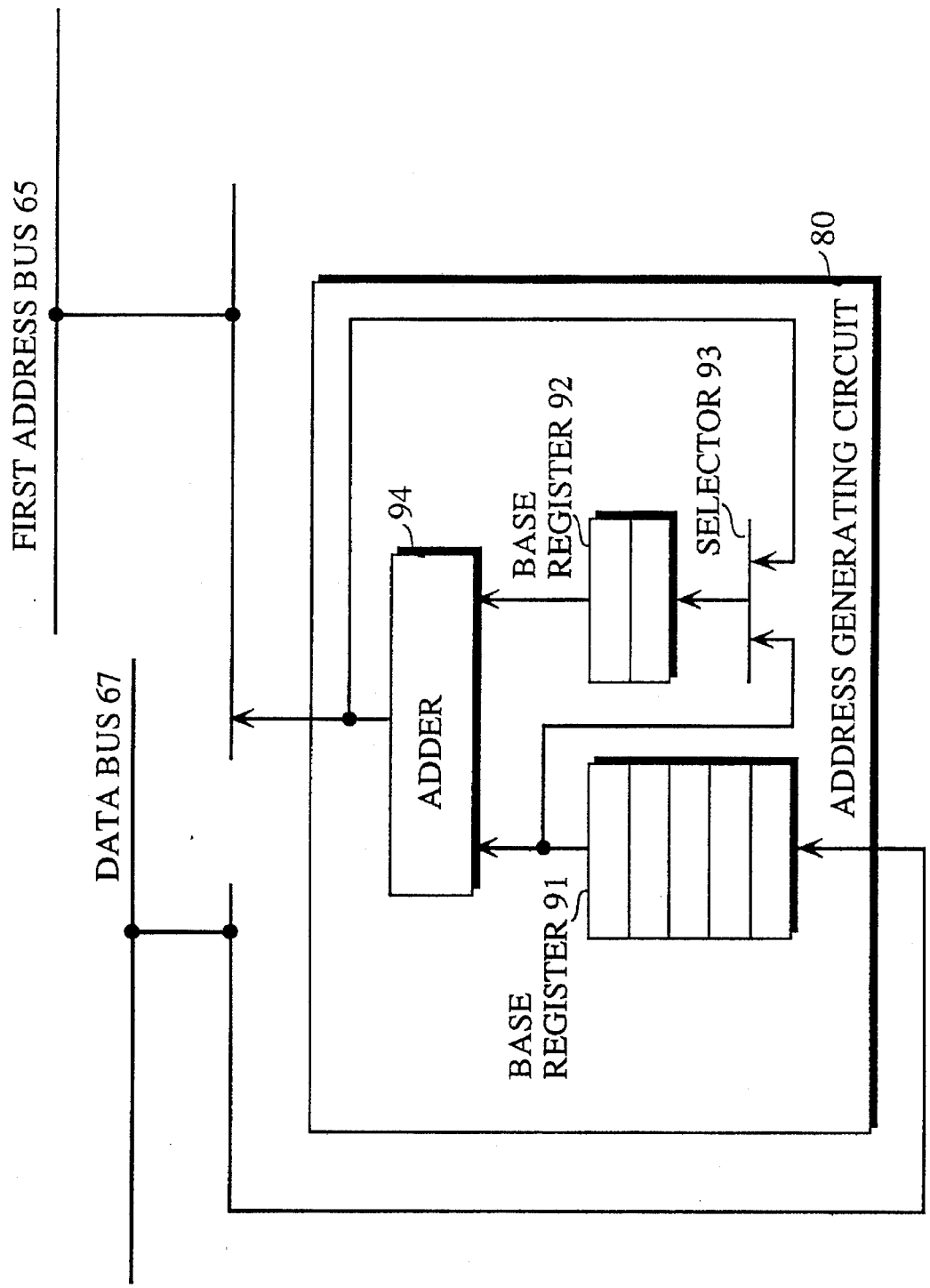
FIG. 9 is a block diagram depicting a structure of an address generating circuit in FIG. 6.

A structure of the address generating circuits 80R, 80S is depicted in FIG. 9; the two generating circuits are of the same structure, although they generate different addresses in the same bit length. The circuit comprises a base register 91, an address register 92, a selector 93, and an adder 94.

The base register 91 holds parameters used to generate the addresses. The parameters referred herein include base addresses of the array data to be transferred and increment (incremental value), which are set by the processor 64 via the data bus 67.

One of the base addresses is selected by the selector 93 and set in the address register 92. Accordingly, the adder 94 adds the value held in the address register 92 and increment held in the base register 91. As a result, the adder 94 outputs the adding result to the first address bus 65, which is an address in the local memory 61 in effect. The adding result outputted to the first address bus 65 is also selected by the selector 93 and set in the address register 92, thereby updating the value in the address register 92.

Figure 10:
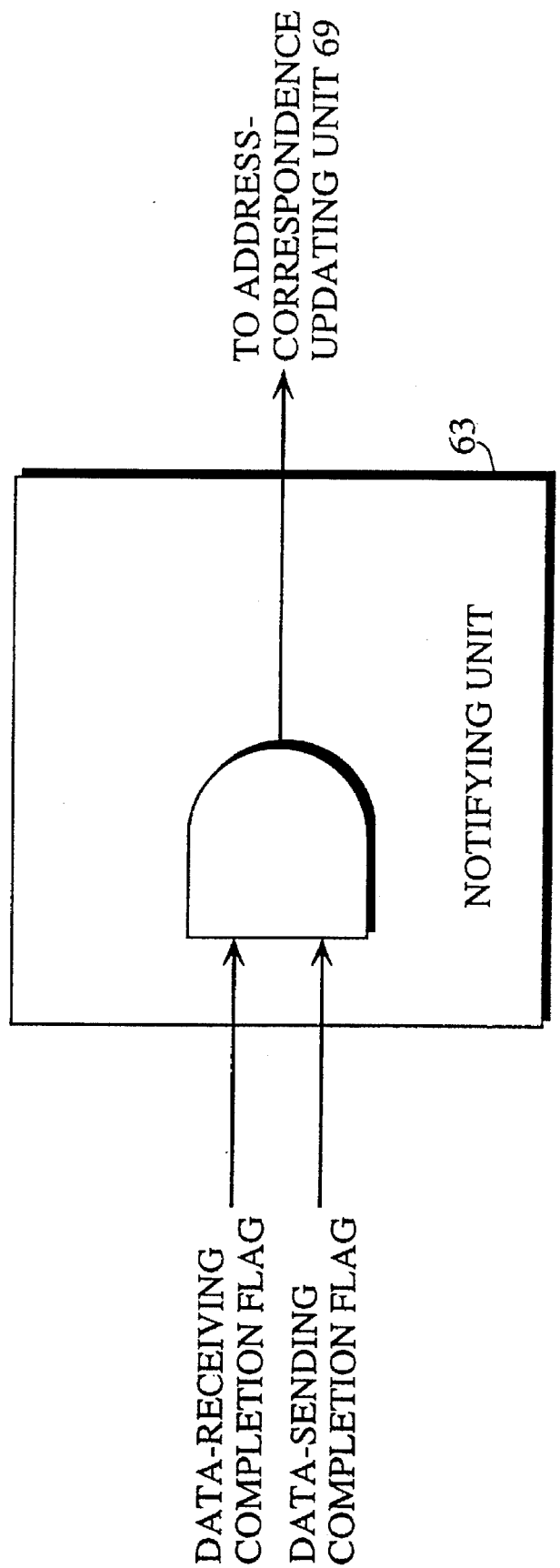
FIG. 10 is a block diagram depicting a structure of a data-transfer-completion notifying unit in FIG. 6.

A structure of the notifying unit 63 is depicted in FIG. 10. The notifying unit 63 notifies the completion of array-data transfer to the address-table updating unit 69 when the values of both the data-receiving and data-sending completion flags are entered into the AND gate and both the flags are set.

Figure 11:
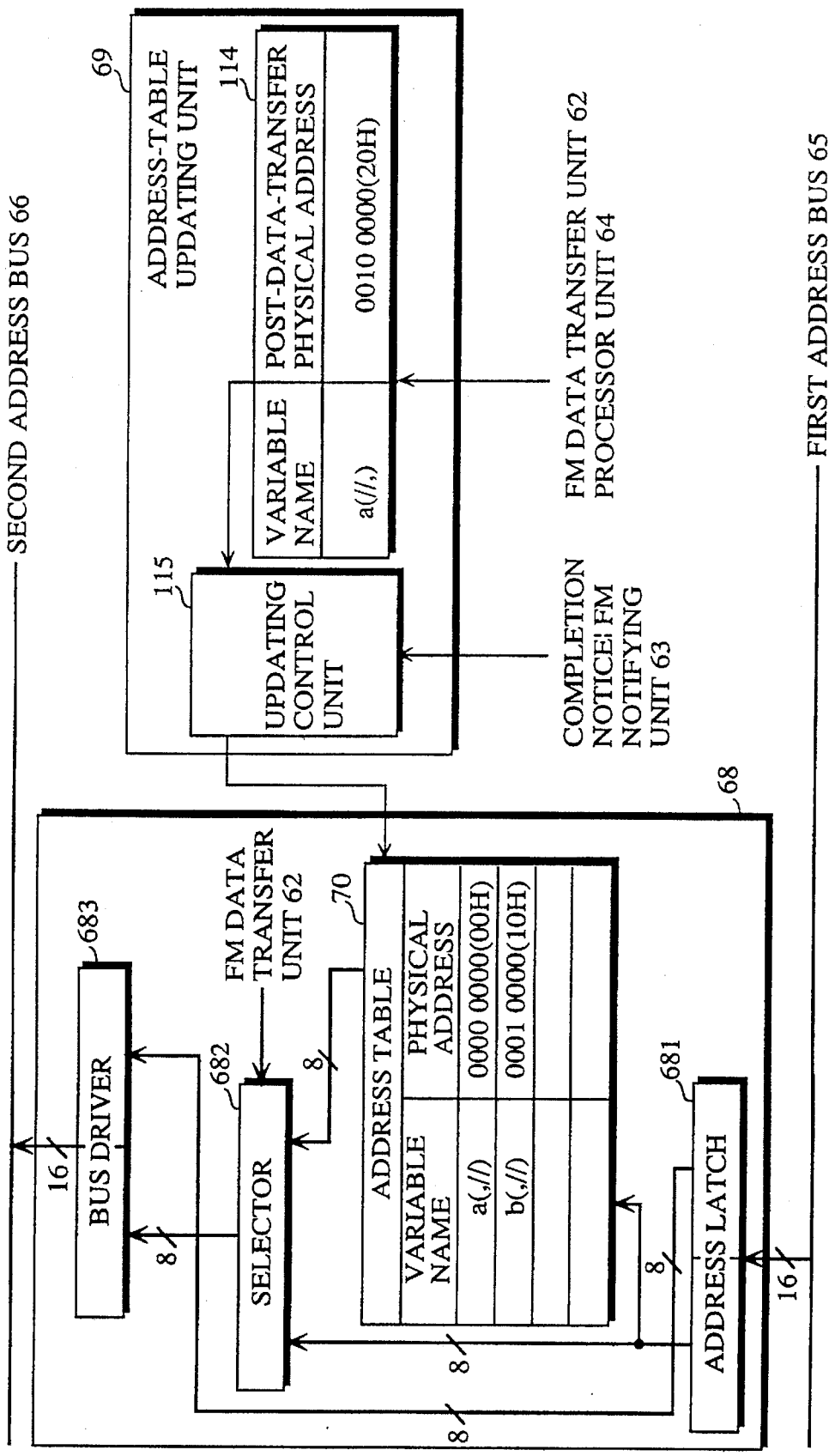
FIG. 11 is a block diagram depicting a structure of an address updating unit and that of an address-table updating unit in FIG. 6.

A structure of the address converting unit 68 and that of the address-table updating unit 69 are depicted in FIG. 11.

The address converting unit 68 comprises an address latch 681, the address table 70, a selector 682, and a bus driver 683. The address converting unit 68 converts the variable-name address received from the first address bus 65 into the physical address to output the same to the second address bus 66.

The address latch 681 latches the variable-name address from the first address bus 65, and sends the high order address thereof to both the address table 70 and selector 682, and the low order address thereof to the bus driver 683. As previously explained, the variable-name address is of the bit-structure shown in FIG. 12.

The address table 70, also as previously described, holds the correspondence of the variable-name addresses and physical addresses. The address table 70 comprises an associative memory: when the high order (variable-name) address is inputted from the address latch 681, it outputs a corresponding physical address in turn. The contents in the address table 70 are read out and written in by the address-table updating unit 69 and processor 64.

The selector 682 receives both the physical address from the address table 70 and the variable-name (high order) address from the address latch 681, and outputs one of them selectively. This selection depends on the kinds of addresses entered into the address latch 681: the selector 682 selects the physical address from the address table 70 when the address latch 681 outputs the variable-name address, while selecting the variable-name address from the address latch 681 otherwise.

In effect, selector 682 operates based on the selection signal from the data transfer control circuit 84. To be more specific, the variable-name address is addressed by the processor 64 and address generating circuit 80S, and the physical address is addressed by the address generating circuit 80R, while the selector 682 selects the output from the address latch 681 based on the selection signal from the data-transfer control circuit 84, which indicates that the address generating circuit 80R addresses the physical address. As a result, of all the received addresses, only the variable-name addresses are converted into the physical addresses while leaving the physical addresses intact.

The bus driver 683 drives the high order address from the selector 682 and low order address from the address latch 681 to the second address bus 66.

The address-table updating unit 69 whose structure is depicted also in FIG. 11 comprises an address updating table 114 and an updating control circuit 115.

The address updating table 114 holds the high order that represents the variable name and the high order of the post-re-partition physical address for each variable name subject to re-partition. The variable name subject to re-partition is set with the high order address of the variable-name address generated by the address generating circuit 80S, and the post-re-partition address is set with the high order address of the physical address generated by the address generating circuit 80R.

The updating control circuit 115 writes in the contents of the address updating table 114 into the address table 70 upon the receipt of the completion notice of the array-data transfer. When the same array name whose partition direction is different exists, the older one is overwritten by the new one.

The parallel computer constructed as above operates in the following way with the source program shown in FIG. 2.

In the source program, Parameter Statement (1) instructs the array size, Declaration Statements (2)–(7) instruct to acquire Storage Area for the array data in the local memory 61; however, the acquired storage areas are not equal to the conventional ones in size.

Figure 14A:
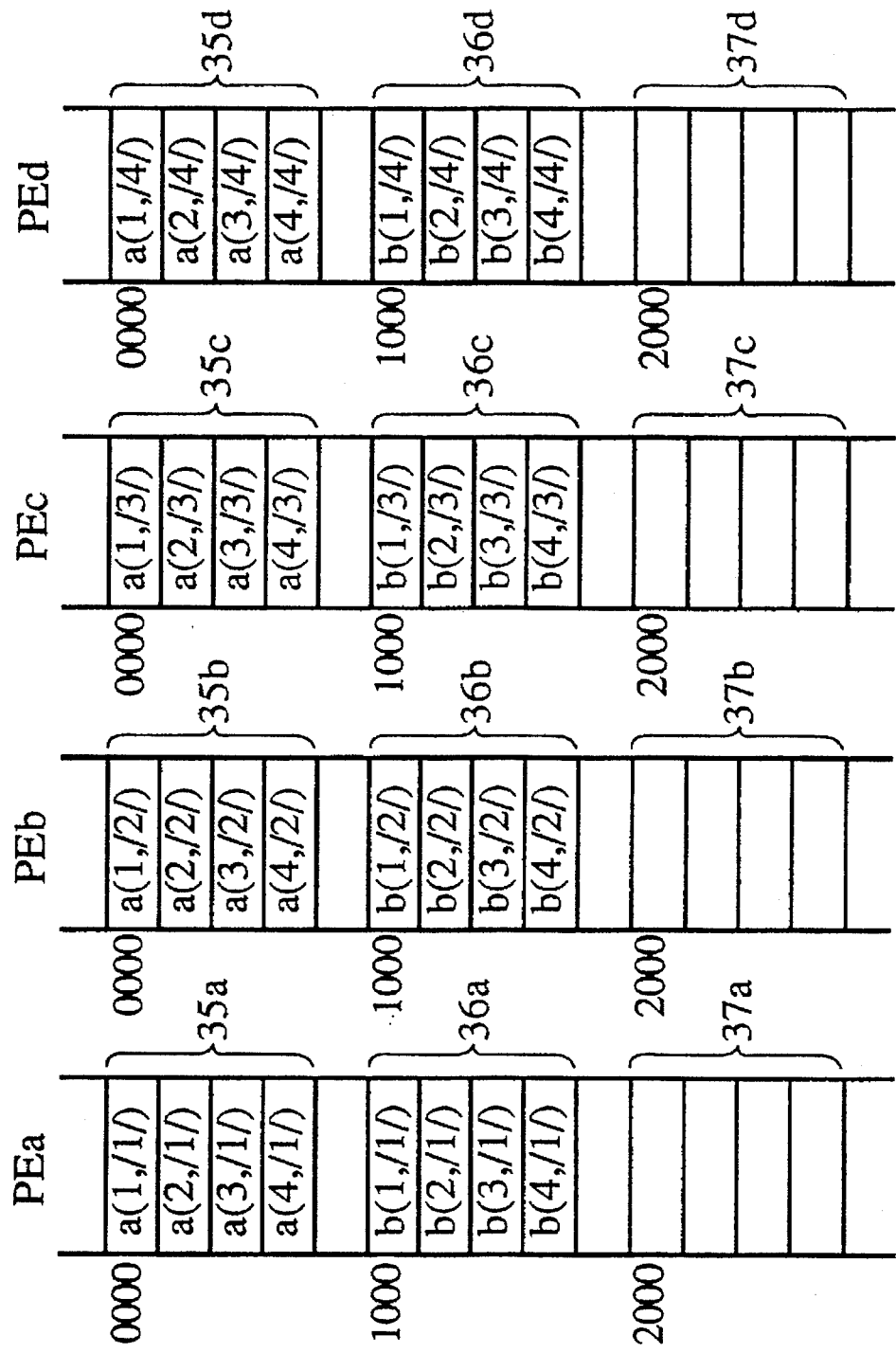
FIG. 14A is a memory map showing acquired storage areas in the local memory of each PE.

More precisely, FIG. 14A is a memory map that shows the acquired storage areas in the local memory in PEa–PEd in accordance with Declaration Statements (2)–(7). Each of Storage Areas 35a–35d has a capacity comparable to one set of array elements (array data) obtained by partitioning the array a in any applicable direction. Similarly, each of Storage Areas 36a–36d have a capacity comparable to one set of array elements (array data) obtained by partitioning the array b in any applicable direction. Storage Areas 37a–37b represent free areas having a capacity comparable to Storage Areas 35a–35d or 36a–36d whichever have a larger capacity. Consequently, the size of the storage areas can be reduced to as small as one array, whereas the conventional parallel computer demands twofold storage areas for each array.

Given these conditions, the source program is translated into the machine program by an unillustrated compiler and loaded into the local memory 61 in each PE. This program loading is carried out under the control of an illustrated control unit installed in the network 3.

Accordingly, the array a(n,n) is partitioned in the direction of the second subscription by translated Pass Statements (8)–(10): each PE stores the distributed array elements as the result of the j-direction partitioning.

In case of the PEa, for example, the data transfer unit 62 receives the set of the array elements a(1,/1/)-a(4,/1/) via the network 3 from the unillustrated control unit, and subsequently writes the same into Storage Area 35a in the local memory 61 via the data bus 67. The individual physical addresses (0000H-) in Storage Area 35a for theses array elements are addressed by the address generating circuit 80R.

At the same time, these individual physical addresses are also written into the address-table updating unit 69 together with the array name (variable name). Accordingly, when the array-data have been transferred to Storage Area 35a, the address-table updating unit 69 registers both the variable name with its partitioned direction and physical addresses into the address table 70 in the address converting unit 68, making it possible to access to the array a by specifying the variable-name address. The address table 70 thus generated is shown in FIG. 14B: the address table 70 holds the variable name a(,//) and the high order byte (00H) of the corresponding physical address. Although the variable name b(,//) and the high order byte (10H) are shown, the address table 70 does not hold them yet at this point.

PEa–PEd operate in the same way, and as a result, the array a is partitioned in the j-direction and the resulting array data are distributed to Storage Areas 35a–35b, respectively; other Storage Areas have stored no array data at this point.

Translated Executable Statements (11)–(15) instruct the processor 64 to compute in parallel with the array data thus stored to find the array b, and the array b thus found is written into the local memory 61 in each PE. More precisely, the variable name b(,//) and corresponding physical address are written into the address table 70 in each PE, making it possible to access to the array b by specifying the variable name address. The result of the calculation, or the elements of the array b, is stored in their respective physical addresses in the local memory 61 by being addressed with the corresponding variable-name addresses. The memory map of the local memory 61, address table 70, and address updating table 114 at this point are shown in FIGS. 14A, 14B, and 14C, respectively. Note that, at this point, Storage Areas 37a–37d have not stored any effective data, whereas the address table 70 holds the array a and array b, while the address updating table 114 holds null data, or it does not hold any address to be converted.

Translated Pass Statements (16)–(19) instruct to repartition the arrays a, b in the direction of the first subscript. The array-data transfer in accordance with translated Pass Statements (17), (18) with respect to the arrays a, b are carried out in the following way.

Figure 15A:
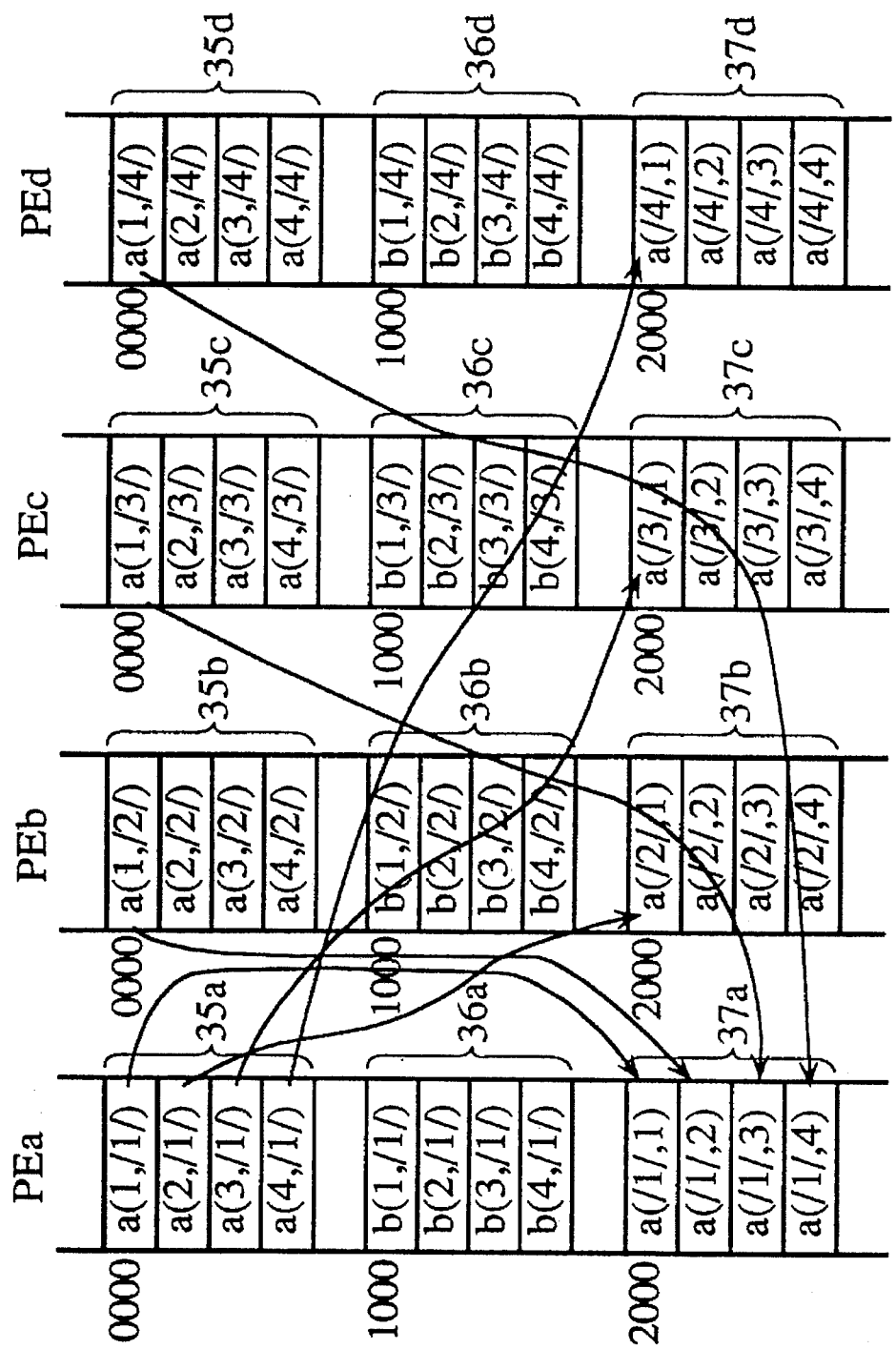
FIG. 15A is a view explaining array-data transfer with respect to PEa in accordance with Pass Statement (17)

The data transfer unit 62 in each PE sends the elements of the array a to the other PE's while receiving the necessary elements of the array a from the other PE's, which is explained in FIG. 15A; FIG. 15B and 15C show the corresponding address table 70 and the address updating table 114, respectively. The data transfer unit 62 sends the array elements in Storage Area 35a to the PEa–PEd, while storing the array elements received from PEa–PEd into Storage Area 37a.

As previously mentioned, the address generating circuit 80S addresses the readout addresses (variable-name address) in Storage Area 35a, which are converted into the physical addresses by the address-table updating unit 69. Whereas the address generating circuit 80R addresses the write-in addresses (physical addresses) in Storage Area 37a. The physical addresses are entered into the local memory 61 via the address converting unit 68 while being set into the address updating table 114.

The data-sending and data-receiving completion flags are set when the foregoing array-data transfer has been completed, and accordingly, the notifying unit 63 notifies the data-transfer-completion to the address-table updating unit 69. The address-table updating unit 69 then writes the variable name a and post-data-transfer physical address (20H) into the address table 70a, updating the same. PEb–PEd operate in the same way.

Figure 16A:
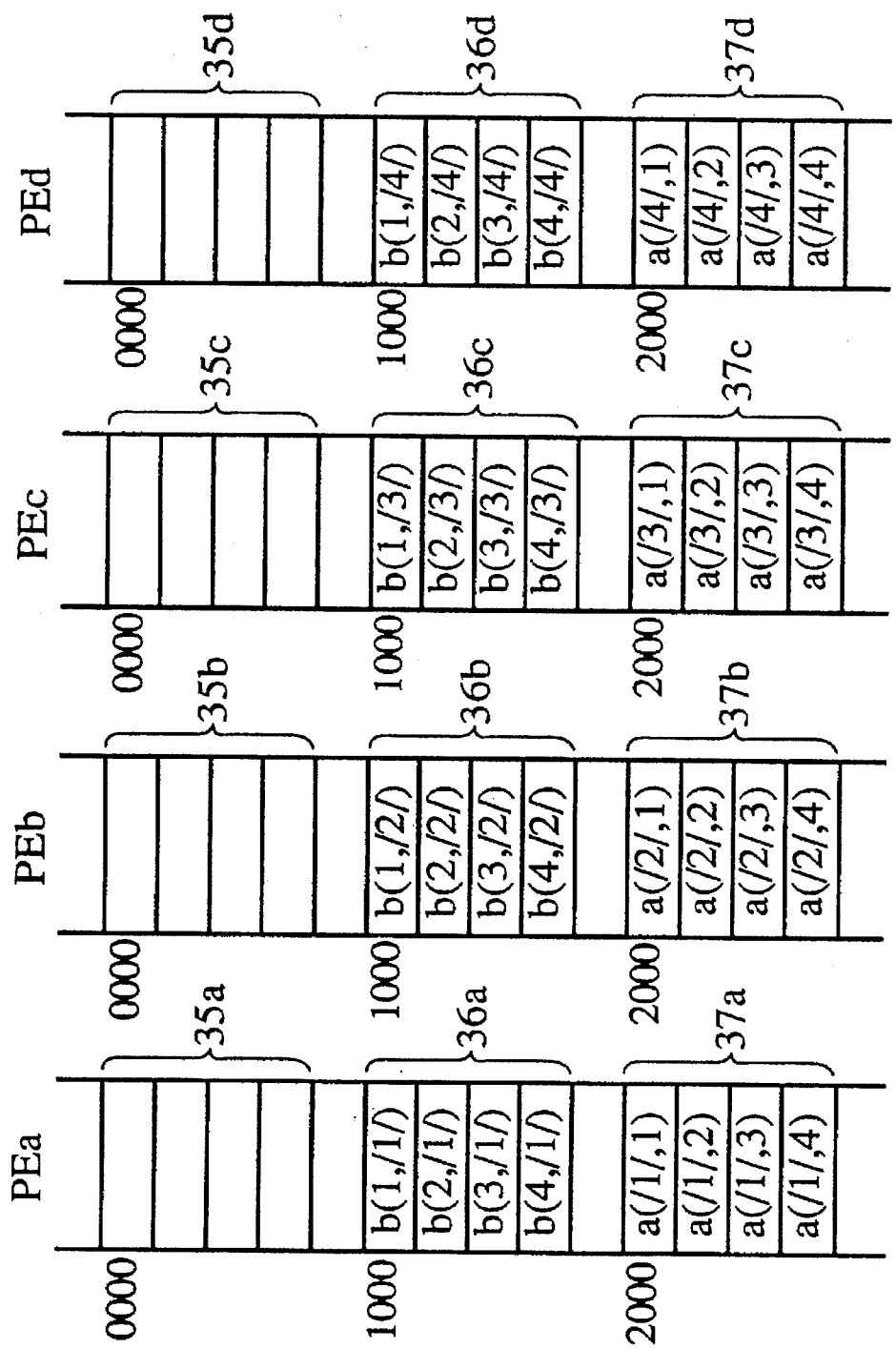
FIG. 16A is a memory map showing storage areas in the local memory of each PE at the completion of Pass Statement (17)

FIG. 16A is the map memory showing the storage areas in the local memory 61 in each PE upon the completion of the array-data transfer in accordance with translated Pass Statement (17), and FIG. 16B and 16C show the corresponding address table 70 and address updating table 114, respectively. Given these conditions, the effective array a and the array b are stored in Storage Areas 36a–36d and 37a–37d, leaving the Storage Area 35a blank. Since the address table 70 in FIG. 16B corresponds to the memory map in FIG. 16A, the variable-name address of the array a will be converted into the physical addresses of Storage Area 37a hereinafter.

Figure 17A:
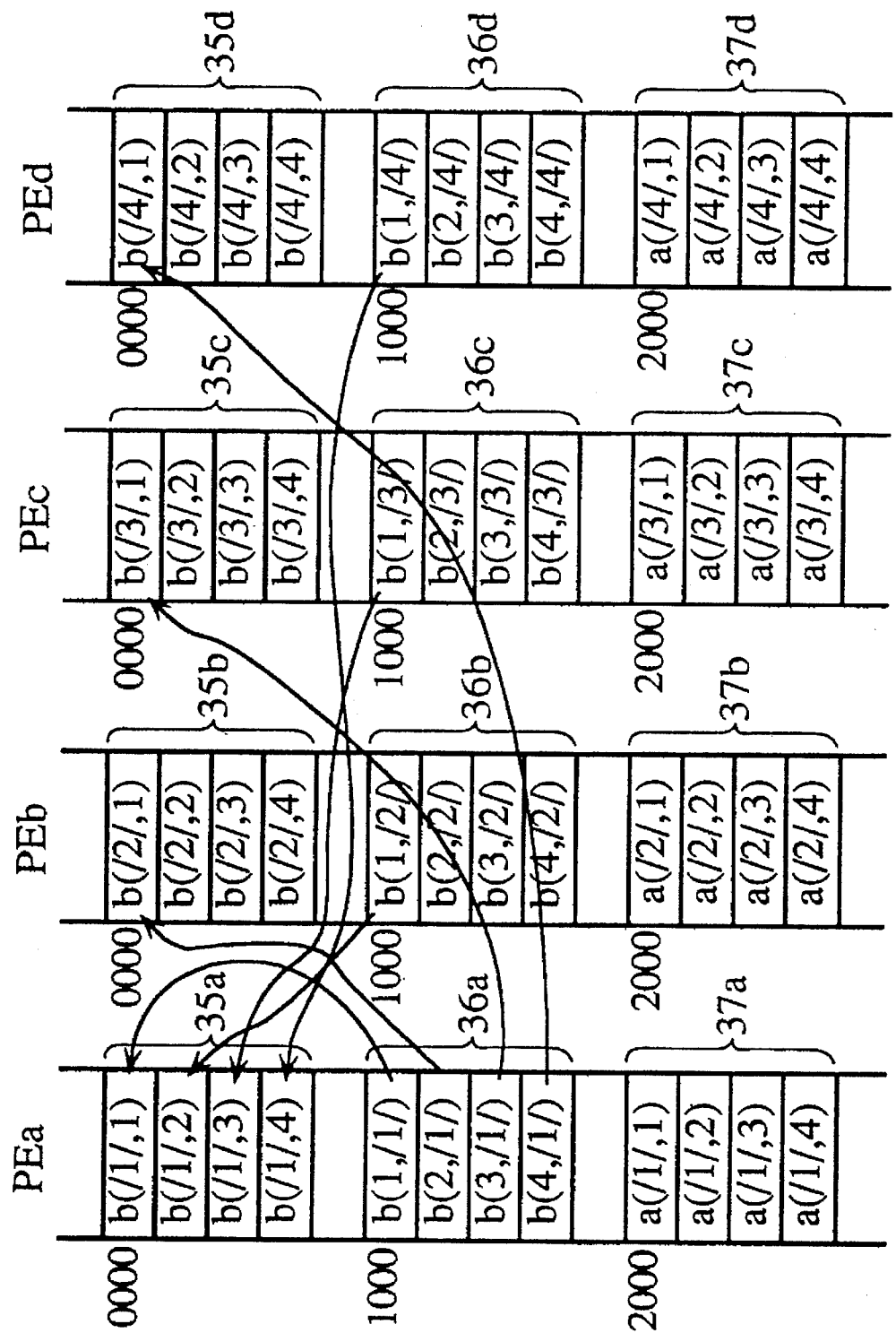
FIG. 17A is a view explaining array-data transfer with respect to PEa in accordance with Pass Statement (18)

Subsequently, the data transfer unit 62 transfers the elements of the array b to the other PE's in accordance with translated Pass Statement (18), while receiving the necessary elements of the array b from the other PE's. FIG. 17A is the memory map showing the storage areas in the local memory 61 of each PE; FIGS. 17B and 17C show the corresponding address table 70 and address-updating table 114, respectively. The data transfer unit 62 sends the array elements stored in Storage Area 36a to PEa–PEd, while storing the array elements received from PEa–PEd into the blank, or free Storage Area 35a.

The address generating circuit 80S generates the readout addresses (variable-name addresses) in Storage Area 36a, which are converted into the physical addresses by the address-table updating unit 69. Whereas the address generating circuit 80R generates the write-in addresses (physical addresses) in Storage Area 35a. The physical addresses are entered into the local memory 61 via the address converting unit 68 while being set into the address updating table 114.

The data-sending and data-receiving completion flags are set when the foregoing array-data transfer has been completed, and accordingly, the notifying unit 63 notifies the data-transfer-completion to the address-table updating unit 69. The address-table updating unit 69 then writes the variable name b(//,) and post-data-transfer physical address (00H) into the address table 70, updating the same. PEb–PEd operate in the same way.

Figure 18A:
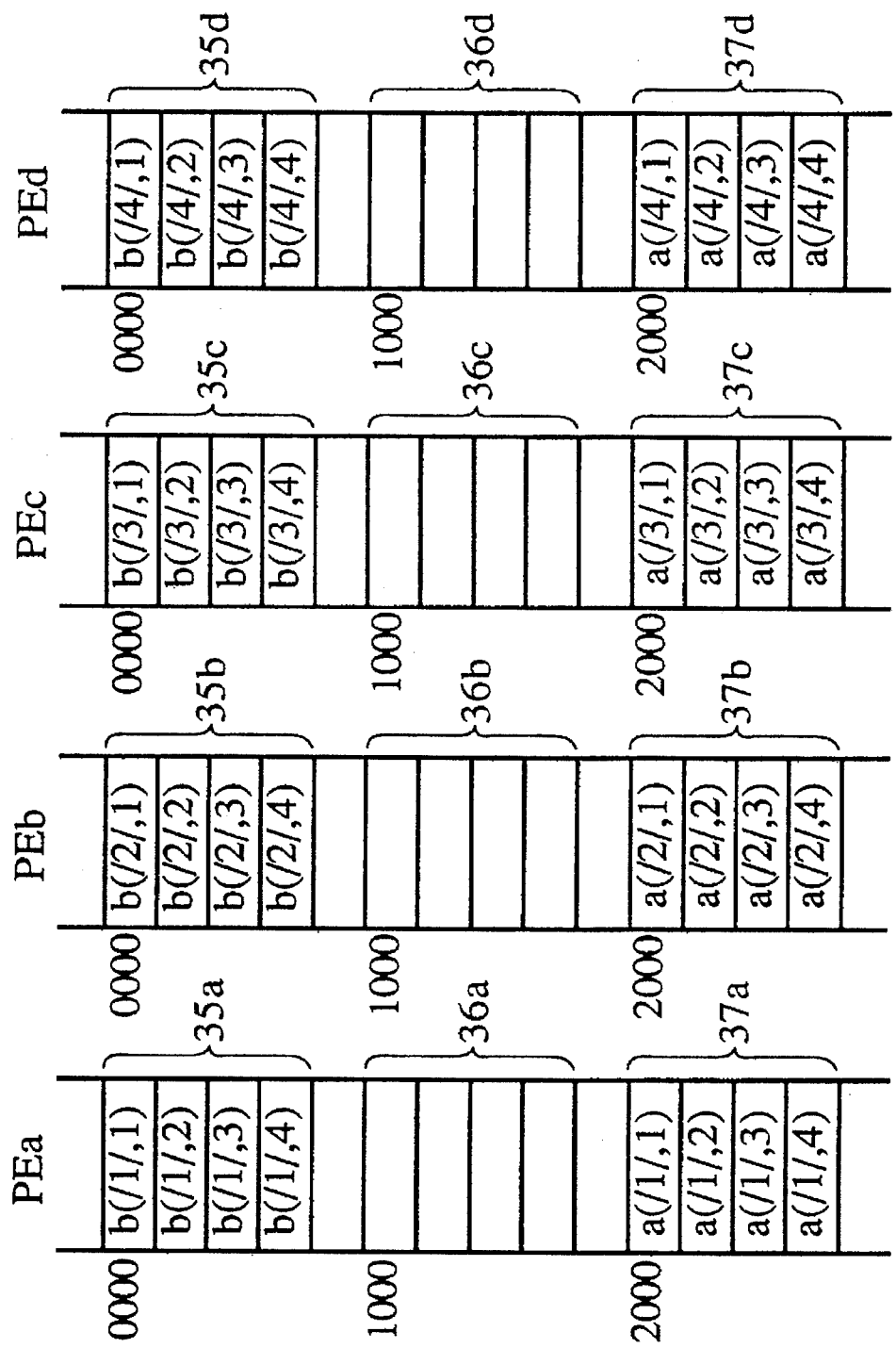
FIG. 18A is a memory map showing the storage areas in the local memory of each PE at the completion of Pass Statement (18)

FIG. 18A is the map memory of the local memory in each PE upon the completion of the data transfer in accordance with translated Pass Statement (18), and FIG. 18B and 18C show the corresponding address table 70 and address updating table 114, respectively. The effective array a and array b are stored in Storage Areas 37a–35d and 35a–35d, leaving Storage Areas 36a–35d blank. Since the address table 70 in FIG. 18B corresponds to the memory map in FIG. 18A, the variable-name address of the array a are converted into the physical addresses of Storage Areas 37a and 35a hereinafter.

Translated Executable Statements (20)–(24) instruct to do a calculation in parallel using the array elements partitioned in the direction of the first subscription. The processor 64 in each PE reads out the necessary elements of the arrays a, b by specifying the corresponding variable-name addresses, and subsequently writes the array b, or the calculation result, by specifying the their respective variable-name addresses.

As has been described in the above, the parallel computer of the present invention utilizes the free area comparable to only one array in size in the local memory 61 even when the array of the same variable name is partitioned in different directions. The same effect can be achieved when several arrays are to be partitioned in different directions.

The address generating circuit 80R may address the variable-name addresses instead of the physical addresses. In this case, the structure remains the same but it operates differently.

The address table 70 additionally may hold the variable name of the free area and the corresponding physical address, both of which can be set by the processor 64 prior to the data transfer.

Although the address-table updating unit 69 and processor 64 writes or updates the address table 70, this can be done by the processor 64 alone: the processor 64 may write the variable name and physical addresses into the address-table updating unit 69 first, and then the address-table updating unit 69 may write the same into the address table 70.

The bit length of the variable name is not restricted to 16 bits as shown in FIG. 12; it can vary depending on the bit length of the address bus used; only the bit lengths of the address-table updating unit 69 and address converting unit 68 must be changed accordingly. Also, the array name of the variable name (high order address) may use a character code (ASCII code), such as 41h for a and 42h for b.

The address converting unit 68 may convert the high order address (variable name) into the base address (head address) of the array in full-bit instated of the high order of the physical address. The address converting unit 68 in this case outputs the full-bit physical address by adding the low order address, making it possible to setting any address as the head address for the storage areas in the local memory 61.

Further, the address converting unit 68 may convert the low order address of the variable-name address as well. In this case, an associative memory for the low order addresses may be installed between the address latch 681 and bus driver 683. As a result, the low order of the variable-name addresses can be of any structure. This was not done in the present invention because the low order can be used as the physical address in the foregoing embodiment: bit 7-2 represents the element number and bit 1, 0 represents the byte address.

Although the present invention has been fully described by way of example with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. In a parallel computer comprising a plurality of processor elements interconnected via a network, the processor element including:

memory means for storing a program and, per array-variable name, a partitioned array variable, the program being run simultaneously by the processor elements, each partitioned array variable being allocated to respective processor elements;

a processor for carrying out a calculation using the partitioned array variable in the memory means, the partitioned array variable being accessed by being addressed with a variable-name address that includes a code representing an array-variable name;

address converting means for holding a variable-name address in relation with a physical address on the memory means for each partitioned array variable to output a corresponding physical address in response to an input of the variable-name address from the processor, wherein the variable-name address includes a first address unit and a second address unit, the first address unit representing a variable name of a partitioned array variable while the second address unit representing an element number contained in the array variable, the address converting means comprising:

an address latch circuit for latching an address including the variable name, the address being outputted from the processor and from the transferring means;

an associative memory for holding the first address unit in relation with a high order of the physical address on the memory means for each partitioned array variable in the memory means to convert the first address unit of the latched address into a high order of a corresponding physical address; and an output circuit for outputting the physical address to the memory means by combining the high order of the physical address from the associative memory and the second address unit from the address latch circuit, wherein the associative memory holds the first address unit in relation with a high order of a physical address of the free area, the first address unit representing the free area instead of the variable name of the partitioned array variable;

transferring means for transferring a partitioned array variable per array-variable name with other processor elements via the network, the partitioned array variable being transferred to be stored into a free area acquired in the memory means when a partition direction changes, the free area being as large as a storage area for one partitioned array variable, wherein the transferring means comprises:

first address-generating means for generating a readout address to read out a partitioned array variable to be sent to the other processor elements from the memory means, the partitioned array variable being sent via the network;

second address-generating means for generating a write-in address to write a partitioned array variable received from the other processor elements into the free area, the partitioned array variable being received via the network;

I/O means for outputting the readout partitioned array variable from the memory means to the network, and inputting the partitioned array variable received from the network into the free area;

controlling means for controlling the readout of the partitioned array variable from the memory means in accordance with the readout address generated by the first address-generating means to be outputted to the other processor elements via the I/O means, and the writing of the partitioned array variable received from the other processor elements via the I/O means into the free area in accordance with the write-in address generated by the second address-generating means, wherein the first address-generating means generates the variable-name address as the readout address, and wherein the second address-generating means generates the variable-name address as the write-in address;

flag holding means for holding a sending-completion flag indicating that all partitioned array variables to be sent have been sent to the other processor elements, and a receiving-completion flag indicating that all partitioned array variables to be received from the other processor elements have been received; and notifying means for notifying a completion of the transfer per array variable name to the address-correspondence updating means when both the flags have been set, both the flags being set by the controlling means; and address-correspondence updating means for updating an address correspondence in the address converting means with a pretransfer variable-name address in relation with a post-transfer physical address each time the transferring means completes the transfer per array-variable name, wherein the address-correspondence updating means includes:

an address updating table for holding a pretransfer variable-name address and a high order of a post-transfer physical address for a partitioned array variable being transferred; and update controlling means for updating the associative memory in accordance with a content in the address updating table when the notifying means notifies a completion of the transfer, the address updating table being set by one of the processor and the transferring means.

2. The processor element of claim 1, wherein the first address unit is a high order address of the variable-name address and the second address unit is a low order address thereof.

3. The processor element of claim 1, wherein the first address unit includes the code representing the array-variable name, the code being a character code.

4. In a parallel computer comprising a plurality of processor elements interconnected via a network, the processor element including:

memory means for storing a program and, per array-variable name, a partitioned array variable, the program being run simultaneously by the processor elements, each partitioned array variable being allocated to respective processor elements;

a processor for carrying out a calculation using the partitioned array variable in the memory means, the partitioned array variable being accessed by being addressed with a variable-name address that includes a code representing an array-variable name;

address converting means for holding a variable-name address in relation with a physical address on the memory means for each partitioned array variable to output a corresponding physical address in response to an input of the variable-name address from the processor, wherein the variable-name address includes a first address unit and a second address unit, the first address unit representing a variable name of a partitioned array variable while the second address unit representing an element number contained in the array variable, the address converting means comprising:

an address latch circuit for latching one of an address including a variable name and a physical address outputted from the processor and from the transferring means;

an associative memory for holding the first address unit in relation with a high order of the physical address on the memory means for each partitioned array variable in the memory means to convert the first address unit of the latched address into a high order of a corresponding physical address;

a selector for selecting one of the first address unit received from the address latch circuit and the high order of the physical address received from the associative memory, the selector being controlled by the processor and the transfer depending on whether the address includes the variable name or the physical address in the memory means; and an output circuit for outputting the physical address to the memory means by combining the selection result by the selector and the second address unit from the address latch circuit, wherein the associative memory holds the first address unit in relation with a high order of a physical address of the free area, the first address unit representing the free area instead of the variable name of the partitioned array variable;

transferring means for transferring a partitioned array variable per array-variable name with other processor elements via the network, the partitioned array variable being transferred to be stored into a free area acquired in the memory means when a partition direction changes, the free area being as large as a storage area for one partitioned array variable, the transferring means comprising:

first address-generating means for generating a readout address to read out a partitioned array variable to be sent to the other processor elements from the memory means, the partitioned array variable being sent via the network;

second address-generating means for generating a write-in address to write a partitioned array variable received from the other processor elements into the free area, the partitioned array variable being received via the network;

I/O means for outputting the readout partitioned array variable from the memory means to the network, and inputting the partitioned array variable received from the network into the free area;

controlling means for controlling the readout of the partitioned array variable from the memory means in accordance with the readout address generated by the first address-generating means to be outputted to the other processor elements via the I/O means, and the writing of the partitioned array variable received from the other processor elements via the I/O means into the free area in accordance with the write-in address generated by the second address-generating means, wherein the first address-generating means generates the variable-name address as the readout address, and wherein the second address-generating means generates the variable-name address as the write-in address;

flag holding means for holding a sending-completion flag indicating that all partitioned array variables to be sent have been sent to the other processor elements, and a receiving-completion flag indicating that all partitioned array variables to be received from the other processor elements have been received; and notifying means for notifying a completion of the transfer per array variable name to the address-correspondence updating means when both the flags have been set, both the flags being set by the controlling means; and address-correspondence updating means for updating an address correspondence in the address converting means with a pretransfer variable-name address in relation with a post-transfer physical address each time the transferring means completes the transfer per array-variable name, the address-correspondence updating means comprising:

an address updating table for holding a pretransfer variable-name address and a high order of a post-transfer physical address for a partitioned array variable being transferred; and update controlling means for updating the associative memory in accordance with a content in the address updating table when the notifying means notifies a completion of the transfer, the address updating table being set by one of the processor and the transferring means.

5. The processor element of claim 4, wherein the first address unit is a high order address of the variable name address and the second address unit is a low order address thereof.

6. The processor element of claim 4, the first address unit includes the code representing the array-variable name, the code being a character code.

7. In a parallel computer comprising a plurality of processor elements interconnected via a network, the processor element including:

memory means for storing a program and, per array-variable name, a partitioned array variable, the program being run simultaneously by the processor elements, each partitioned array variable being allocated to respective processor elements;

a processor for carrying out a calculation using the partitioned array variable in the memory means, the partitioned array variable being accessed by being addressed with a variable-name address that includes a code representing an array-variable name;

address converting means for holding a variable-name address in relation with a physical address on the memory means for each partitioned array variable to output a corresponding physical address in response to an input of the variable-name address from the processor, wherein the variable-name address includes a first address unit and a second address unit, the first address unit representing a variable name of a partitioned array variable while the second address unit representing an element number contained in the array variable, the address converting means comprising:

an address latch circuit for latching one of an address including a variable name and a physical address outputted from the processor and from the transferring means;

an associative memory for holding the first address unit in relation with a high order of the physical address on the memory means for each partitioned array variable in the memory means to convert the first address unit of the latched address into a high order of a corresponding physical address;

a selector for selecting one of the first address unit received from the address latch circuit and the high order of the physical address received from the associative memory, the selector being controlled by the processor and the transfer depending on whether the address includes the variable name or the physical address in the memory means; and an output circuit for outputting the physical address to the memory means by combining the selection result by the selector and the second address unit from the address latch circuit;

transferring means for transferring a partitioned array variable per array-variable name with other processor elements via the network, the partitioned array variable being transferred to be stored into a free area acquired in the memory means when a partition direction changes, the free area being as large as a storage area for one partitioned array variable, the transferring means comprising:

first address-generating means for generating a readout address to read out a partitioned array variable to be sent to the other processor elements from the memory means, the partitioned array variable being sent via the network;

second address-generating means for generating a write-in address to write a partitioned array variable received from the other processor elements into the free area, the partitioned array variable being received via the network, wherein the first address-generating means generates the variable-name address as the readout address, and wherein the second address-generating means generates the physical address as the write-in address;

I/O means for outputting the readout partitioned array variable from the memory means to the network, and inputting the partitioned array variable received from the network into the free area;

controlling means for controlling the readout of the partitioned array variable from the memory means in accordance with the readout address generated by the first address-generating means to be outputted to the other processor elements via the I/O means, and the writing of the partitioned array variable received from the other processor elements via the I/O means into the free area in accordance with the write-in address generated by the second address-generating means;

flag holding means for holding a sending-completion flag indicating that all partitioned array variables to be sent have been sent to the other processor elements, and a receiving-completion flag indicating that all partitioned array variables to be received from the other processor elements have been received; and notifying means for notifying a completion of the transfer per array variable name to the address-correspondence updating means when both the flags have been set, both the flags being set by the controlling means; and address-correspondence updating means for updating an address correspondence in the address converting means with a pretransfer variable-name address in relation with a post-transfer physical address each time the transferring means completes the transfer per array-variable name, the address-correspondence updating means comprising:

an address updating table for holding a pretransfer variable-name address and a high order of a post-transfer physical address for a partitioned array variable being transferred; and update controlling means for updating the associative memory in accordance with a content in the address updating table when the notifying means notifies a completion of the transfer, the address updating table being set by one of the processor and the transferring means.

8. The processor element of claim 7, wherein the first address unit is a high order address of the variable name address and the second address unit is a low order address thereof.

9. The processor element of claim 7, wherein the first address unit includes the code representing the array variable name, the code being a character code.

10. In a processor element comprising a plurality of processor elements interconnected via a network, the processor element including:

memory means for storing a program and, per array-variable name, a partitioned array variable, the program being run simultaneously by the processor elements, each partitioned array variable being allocated to respective processor elements;

a processor for carrying a calculation using the partitioned array variable, the partitioned array variable being accessed by being addressed with a variable-name address including a first address unit representing an array-variable name and a second address unit indicating an element number;

an address latch circuit for latching the variable name address to access to the memory means;

an associative memory for holding the first address unit in relation with a high order of the physical address on the memory means for each partitioned array variable in the memory means to convert the first address unit of the latched variable-name address into a high order of a corresponding physical address;

an output circuit for outputting the physical address to the memory means by combining the high order of the physical address from the associative memory and the second address unit from the address latch circuit;

transferring means for transferring a partitioned array variable per array-variable name with other processor elements via the network, the partitioned array-variable being transferred to be stored into a free area acquired by the memory means when a partition direction changes, the free area being as large as a storage area for one partitioned array variable, the transferring means comprising:

flag holding means for holding a sending-completion flag indicating that all partitioned array variables to be sent have been sent to other processor elements, and a receiving completion flag indicating that all partitioned array variables to be received from the other processors have been received; and notifying means for notifying a completion of the transfer per array variable name to the associative memory when both the flags have been set, both the flags being set by the controlling means; and address-correspondence updating means for updating an address correspondence in the associative memory with a pretransfer variable-name address in relation with a high order of a post-transfer physical address, the address-correspondence updating means comprising:

an address updating table for holding a pretransfer variable-name address and a high order of a post-transfer physical address for a partitioned array variable being transferred; and update controlling means for updating the associative memory in accordance with a content in the address updating table when the notifying means notifies a completion of the transfer, the address updating table being set by one of the processor and the transferring means.

11. In a processor element comprising a plurality of processor elements interconnected via a network, the processor element including:

memory means for storing a program and, per array variable name, a partitioned array-variable, the program being run simultaneously by the processor elements, each partitioned array variable being allocated to respective processor elements;

a processor for carrying a calculation using the partitioned array variable, the partitioned array variable being accessed by being addressed with a variable-name address that includes a first address unit representing an array variable name and a second address unit indicating an element number;

an address latch circuit for latching the variable name address to access to the memory means;

an associative memory for holding the first address unit in relation with a high order of a physical address on the memory means to convert the first address unit of the latched address into a high order of a corresponding physical address;

a selector for selecting one of the first address unit received from the address latch circuit and the high order of the physical address received from the associative memory, the selector being controlled by the processor, the transfer depending on whether the address includes the variable name or the physical address in the memory means;

an output circuit for outputting the physical address to the memory means by combining the selection result by the selector and the second address unit from the address latch circuit;

transferring means for transferring a partitioned array variable per array-variable name with other processor elements via the network, the partitioned array variable being transferred to be stored into a free area acquired in the memory means when a partition direction changes, the free area being as large as a storage area for one partitioned array variable, the transferring means comprising:

flag holding means for holding a sending-completion flag indicating that all partitioned array variables to be sent have been sent to other processor elements, and a receiving completion flag indicating that all partitioned array variables to be received from the other processors have been received; and notifying means for notifying a completion of the transfer per array variable name to the associative memory when both the flags have been set, both the flags being set by the controlling means; and address-correspondence updating means for updating an address correspondence in the associative memory with a pretransfer variable-name address in relation with a high order of a post-transfer physical address each time the transferring means completes the transfer per array-variable name, the address-correspondence updating means comprising:

an address updating table for holding a pretransfer variable-name address and a high order of a post-transfer physical address for a partitioned array variable being transferred; and update controlling means for updating the associative memory in accordance with a content in the address updating table when the notifying means notifies a completion of the transfer, the address updating table being set by one of the processor and transferring means.

* * * * *